US010666948B2

(12) United States Patent
Rosewarne et al.

(10) Patent No.: US 10,666,948 B2
(45) Date of Patent: May 26, 2020

(54) METHOD, APPARATUS AND SYSTEM FOR ENCODING AND DECODING VIDEO DATA

(71) Applicant: CANON KABUSHIKI KAISHA, Tokyo (JP)

(72) Inventors: Christopher James Rosewarne, Concord West (AU); Volodymyr Kolesnikov, Dee Why (AU)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 15/709,101

(22) Filed: Sep. 19, 2017

(65) Prior Publication Data
US 2018/0084284 A1    Mar. 22, 2018

(30) Foreign Application Priority Data

Sep. 22, 2016 (AU) .............................. 2016231584

(51) Int. Cl.
H04N 19/96 (2014.01)
H04N 19/119 (2014.01)
H04N 19/176 (2014.01)
H04N 19/147 (2014.01)
H04N 19/124 (2014.01)
H04N 19/159 (2014.01)
H04N 19/19 (2014.01)
H04N 19/91 (2014.01)
H04N 19/146 (2014.01)

(52) U.S. Cl.
CPC ......... H04N 19/146 (2014.11); H04N 19/119 (2014.11); H04N 19/124 (2014.11); H04N 19/147 (2014.11); H04N 19/159 (2014.11); H04N 19/176 (2014.11); H04N 19/19 (2014.11); H04N 19/91 (2014.11); H04N 19/96 (2014.11)

(58) Field of Classification Search
None
See application file for complete search history.

(56) References Cited

U.S. PATENT DOCUMENTS

| 6,778,709 B1* | 8/2004 | Taubman | H04N 19/70 348/395.1 |
|---|---|---|---|
| 2008/0298702 A1* | 12/2008 | Gunupudi | H04N 19/149 382/251 |
| 2010/0080290 A1* | 4/2010 | Mehrotra | H04N 19/147 375/240.07 |

(Continued)

OTHER PUBLICATIONS

Xiu et al., "HEVC Screen Content Coding Core Experiment 5 (SCCE5): Inter-component prediction and adaptive color transforms," JCTVC-Q1125, 4 pp. (Mar. 2014).*

Primary Examiner — Michael J Hess
(74) Attorney, Agent, or Firm — Canon U.S.A., Inc. IP Division

(57) ABSTRACT

A method of encoding a coding tree unit in a video bitstream. A plurality of candidate configurations are formed for the coding tree unit, each of the candidate configurations having a variation of at least one of a set of partitioning modes and encoding parameters. A candidate configuration is selected from the plurality of candidate configurations based on a predetermined maximum bit rate for the coding tree unit, the selected candidate configuration having a size within the predetermined maximum bit rate. The coding tree unit is encoded using the selected candidate configuration.

13 Claims, 20 Drawing Sheets

(56) References Cited

U.S. PATENT DOCUMENTS

| | | | |
|---|---|---|---|
| 2010/0195713 A1* | 8/2010 | Coulombe | H04N 19/172 375/240.02 |
| 2014/0072041 A1* | 3/2014 | Seregin | H04N 19/105 375/240.13 |
| 2014/0254676 A1* | 9/2014 | Jiang | H04N 19/124 375/240.12 |
| 2014/0307785 A1* | 10/2014 | Topiwala | H04N 19/164 375/240.07 |
| 2015/0078443 A1* | 3/2015 | Kolesnikov | H03M 7/4075 375/240.03 |
| 2015/0264403 A1* | 9/2015 | Chong | H04N 19/61 375/240.18 |
| 2016/0029035 A1* | 1/2016 | Nguyen | H04N 19/597 375/240.12 |
| 2016/0212427 A1* | 7/2016 | Yoneoka | H04N 19/124 |
| 2016/0301931 A1* | 10/2016 | Wen | H04N 19/147 |
| 2017/0085917 A1* | 3/2017 | Hannuksela | H04N 19/597 |
| 2017/0155922 A1* | 6/2017 | Yoo | H04N 19/119 |
| 2017/0195675 A1* | 7/2017 | Seok | H04N 19/147 |
| 2018/0295385 A1* | 10/2018 | Alshin | H04N 19/176 |

* cited by examiner

METHOD, APPARATUS AND SYSTEM FOR ENCODING AND DECODING VIDEO DATA

REFERENCE TO RELATED PATENT APPLICATION(S)

This application claims the benefit under 35 U.S.C. § 119 of the filing date of Australian Patent Application No. 2016231584, filed Sep. 22, 2016, hereby incorporated by reference in its entirety as if fully set forth herein.

TECHNICAL FIELD

The present invention relates generally to digital video signal processing and, in particular, to a method, apparatus and system for encoding and decoding video data. The present invention also relates to a computer program product including a computer readable medium having recorded thereon a computer program for encoding and decoding video data.

BACKGROUND

Many applications for video coding currently exist, including applications for transmission and storage of video data. Many video coding standards have also been developed and others are currently in development. Recent developments in video coding standardisation have led to the formation of a group called the "Joint Collaborative Team on Video Coding" (JCT-VC). The Joint Collaborative Team on Video Coding (JCT-VC) includes members of Study Group 16, Question 6 (SG16/Q6) of the Telecommunication Standardisation Sector (ITU-T) of the International Telecommunication Union (ITU), known as the Video Coding Experts Group (VCEG), and members of the International Organisations for Standardisation/International Electrotechnical Commission Joint Technical Committee 1/Subcommittee 29/Working Group 11 (ISO/IEC JTC1/SC29/WG11), also known as the Moving Picture Experts Group (MPEG).

The Joint Collaborative Team on Video Coding (JCT-VC) has produced a new video coding standard that significantly outperforms the "H.264/MPEG-4 AVC" (ISO/IEC 14496-10) video coding standard. The new video coding standard has been named "high efficiency video coding (HEVC)".

Other developments, e.g. in the Video Electronics Standards Association (VESA), have been directed towards video coding algorithms capable of latencies under one frame. Traditional video compression standards, such as H.264/AVC and HEVC, have latencies of multiple frames (or at least one frame), as measured from an input of the encoding process to the output of the decoding process. Codecs complying with such standards may be termed 'distribution codecs', as codecs are intended to provide compression for distribution of video data from a source, such as a studio, to the end consumer (e.g. via terrestrial broadcast or internet streaming). HEVC does have signalling support for latencies under one frame, in the form of a Decoding Unit Supplementary Enhancement Information (SEI) message. The Decoding Unit SEI message is an extension of the timing signalling present in the Picture Timing SEI message, allowing specification of the timing of units less than one frame. However, the signalling is insufficient to achieve very low latencies with minimal buffering, and consequently results in tight coupling of the encoding and decoding processes. Applications requiring low latency are generally present within a broadcast studio.

In a broadcast studio, video may be captured by a camera before undergoing several transformations, including real-time editing, graphic and overlay insertion and muxing. Once the video has been adequately processed, a distribution encoder is used to encode the video data for final distribution to end consumers. Within the studio, the video data is generally transported in an uncompressed format. This necessitates the use of very high speed links. Variants of the Serial Digital Interface (SDI) protocol can transport different video formats. For example, 3G-SDI (operating with a 3 Gbps electrical link) can transport 1080p HDTV (1920× 1080 resolution) at thirty (30)fps and eight (8) bits per sample. Interfaces having a fixed bit rate are suited to transporting data having a constant bit rate (CBR). Uncompressed video data is generally CBR, and compressed video data may also be CBR. As bit rates increase, achievable cabling lengths reduce, which becomes problematic for cable routing through a studio. For example, UHDTV (3840×2160) requires a four times (4×) increase in bandwidth compared to 1080p HDTV, implying a 12 Gbps interface. Increasing the data rate of a single electrical channel reduces the achievable length of the cabling. At 3 Gbps, cable runs generally cannot exceed one hundred and fifty (150) metres, the minimum usable length for studio applications.

One method of achieving higher rate links is by replicating cabling (e.g. by using four 3G-SDI links), with frame tiling or some other multiplexing scheme. However, the cabling replicating method increases cable routing complexity, requires more physical space, and may reduce reliability compared to use of a single cable. Thus, a codec that can perform compression at relatively low compression ratios (e.g. 4:1) while retaining a 'visually lossless' (i.e. having no perceivable artefacts compared to the original video data) level of performance is required by industry. Compression ratios may also be expressed as the number of 'bits per pixel' (bpp) afforded to the compressed stream, noting that conversion back to a compression ratio requires knowledge of the bit depth of the uncompressed signal, and the chroma format. For example, eight (8) bit 4:4:4 video data occupies 24 bpp uncompressed, so 4 bpp implies a 6:1 compression ratio.

The Display Stream Compression Sub-group within VESA has produced a standard named Display Stream Compression (DSC) and is standardising a newer variant named Advanced Display Stream Compression (ADSC). However, this activity is directed more towards distribution of high-resolution video data between components within electronic devices, such as smart phones and tablets, as a means of reducing the printed circuit board (PCB) routing difficulties for supporting very high resolutions (e.g. as used in 'retina' displays), by reducing either the clock rate or the number of required PCB traces. As such, ADSC is targeting applications where a single encode-decode cycle ('single-generation' operation) is anticipated. Within a broadcast studio, video data is typically passed between several processing stages prior to final encoding for distribution. For passing UHD video data through bandwidth-limited interfaces, such as 3G-SDI, multiple encode-decode cycles ('multi-generational' operation) is anticipated. Then, the quality level of the video data must remain visually lossless after as many as seven encode-decode cycles.

Video data includes one or more colour channels. Generally there is one primary colour channel and two secondary colour channels. The primary colour channel is generally referred to as the 'luma' channel and the secondary colour channel(s) are generally referred to as the 'chroma' channels. Video data is represented using a colour space, such as 'YCbCr' or 'RGB'. Some applications require visually lossless compression of the output of a computer graphics card, or transmission from a SOC in a tablet to the LCD panel in the tablet. Such content often has different statistical properties from content captured from a camera, due to the use of rendering widgets, text, icons etc. Such applications can be referred to as 'screen content applications'. For screen content applications, 'RGB' is commonly used, as this is the format generally used to drive LCD panels. Note that the greatest signal strength is present in the 'G' (green) channel, so generally the G channel is coded using the primary colour channel, and the remaining channels (i.e. 'B' and 'R') are coded using the secondary colour channels. This arrangement may be referred to as 'GBR'. When the 'YCbCr' colour space is in use, the 'Y' channel is coded using the primary colour channel and the 'Cb' and 'Cr' channels are coded using the secondary colour channels.

Video data is also represented using a particular chroma format. The primary colour channel and the secondary colour channels are spatially sampled at the same spatial density when the 4:4:4 chroma format is in use. For screen content, the commonly used chroma format is 4:4:4, as generally LCD panels provide pixels at a 4:4:4 chroma format. The bit-depth defines the bit width of samples in the respective colour channel, which implies a range of available sample values. Generally, all colour channels have the same bit-depth, although colour channels may alternatively have different bit-depths. Other chroma formats are also possible. For example, if the chroma channels are sampled at half the rate vertically (compared to the luma channel), a 4:2:2 chroma format is said to be in use. Also, if the chroma channels are sampled at half the rate horizontally and vertically (compared to the luma channel), a 4:2:0 chroma format is said to be in use. These chroma formats exploit a characteristic of the human visual system that sensitivity to intensity is higher than sensitivity to colour. As such, it is possible to reduce sampling of the colour channels without causing undue visual impact. However, reducing sampling of the colour channels without causing undue visual impactis less applicable to studio environments, where multiple generations of encoding and decoding are common. Also, for screen content the use of chroma formats other than 4:4:4 can be problematic as distortion is introduced to sub-pixel rendered (or 'anti-aliased') text and sharp object edges.

Frame data may also contain a mixture of screen content and camera captured content. For example, a computer screen may include various content such as windows, icons, control buttons, and text, and also contain a video being played, or an image being viewed. Such content, in terms of the entirety of a computer screen, can be referred to as 'mixed content'. Moreover, the level of detail (or 'texture') varies within a frame. Generally, regions of detailed textures (e.g. foliage, text), or regions containing noise (e.g. from a camera sensor) are difficult to compress. The detailed textures can only be coded at a low compression ratio without losing detail. Conversely, regions with little detail (e.g. flat regions, sky, background from a computer application) can be coded with a high compression ratio, with little loss of detail.

In the context of sub-frame latency video compression, the buffering included in the video encoder and the video decoder is generally substantially smaller than one frame (e.g. only dozens of lines of samples). Then, the video encoder and video decoder must not only operate in real-time, but also with sufficiently tightly controlled timing that the available buffers do not underrun or overrun. In the context of real-time operation, it is not possible to stall input or delay output (e.g. due to buffer overrun or underrun). If input was stalled or output delayed, the result would be some highly noticeable distortion of the video data being passed through the video encoder and decoder. Thus, a need exists for algorithms to control the behaviour of the video encoder and decoder to avoid such situations.

SUMMARY

It is an object of the present invention to substantially overcome, or at least ameliorate, one or more disadvantages of existing arrangements.

According to one aspect of the present disclosure, there is provided a method of encoding a coding tree unit in a video bitstream, the method comprising:

forming a plurality of candidate configurations for the coding tree unit, each of the candidate configurations having a variation of at least one of a set of partitioning modes and encoding parameters;

selecting a candidate configuration from the plurality of candidate configurations based on a predetermined maximum bit rate for the coding tree unit, the selected candidate configuration having a size within the predetermined maximum bit rate; and encoding the coding tree unit using the selected candidate configuration.

According to another aspect of the present disclosure, there is provided an apparatus for encoding a coding tree unit in a video bitstream, the apparatus comprising: means for forming a plurality of candidate configurations for the coding tree unit, each of the candidate configurations having a variation of at least one of a set of partitioning modes and encoding parameters;

means for selecting a candidate configuration from the plurality of candidate configurations based on a predetermined maximum bit rate for the coding tree unit, the selected candidate configuration having a size within the bit rate; and means for encoding the coding tree unit using the selected candidate configuration.

According to another aspect of the present disclosure, there is provided a system for encoding a coding tree unit in a video bitstream, the system comprising:

a memory storing data and a computer program;

a processor coupled to the memory for executing the computer program, the computer program having instructions for:

forming a plurality of candidate configurations for the coding tree unit, each of the candidate configurations having a variation of at least one of a set of partitioning modes and encoding parameters;

selecting a candidate configuration from the plurality of candidate configurations based on a predetermined maximum bit rate for the coding tree unit, the selected candidate configuration having a size within the bit rate; and encoding the coding tree unit using the selected candidate configuration.

According to another aspect of the present disclosure, there is provided a non-transitory computer readable medium having a computer program stored therein for encoding a coding tree unit in a video bitstream, the program comprising:

code for forming a plurality of candidate configurations for the coding tree unit, each of the candidate configurations having a variation of at least one of a set of partitioning modes and encoding parameters;

code for selecting a candidate configuration from the plurality of candidate configurations based on a predetermined maximum bit rate for the coding tree unit, the selected candidate configuration having a size within the bit rate; and code for encoding the coding tree unit using the selected candidate configuration.

Other aspects are also disclosed.

BRIEF DESCRIPTION OF THE DRAWINGS

At least one embodiment of the present invention will now be described with reference to the following drawings and and appendices, in which.

Figure 14A:
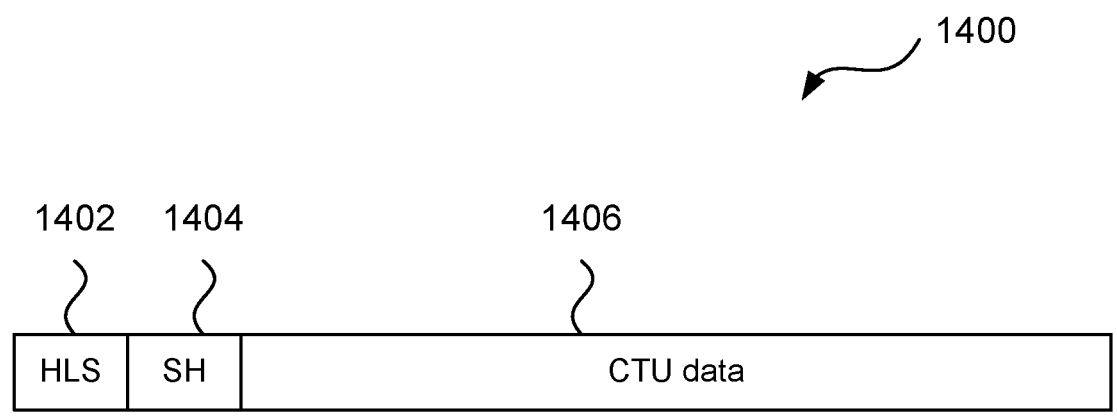
FIG. 14A is a schematic block diagram showing a first compressed slice segment in a compressed frame of video data.
Figure 14B:
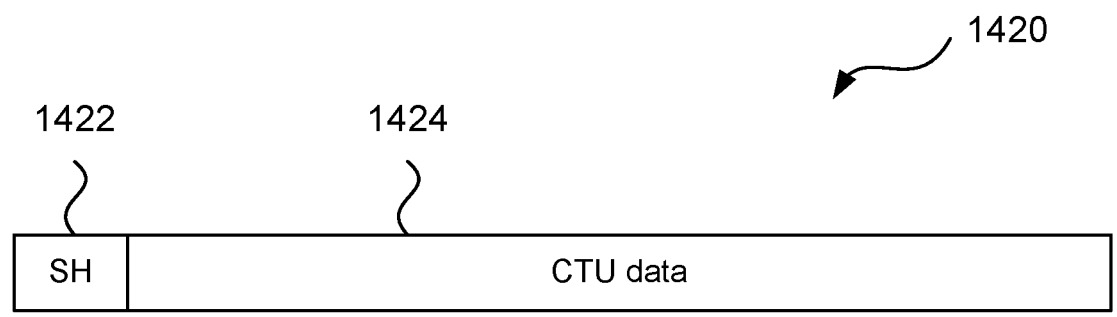
FIG. 14B is a schematic block diagram showing a non-first compressed slice segment in a compressed frame of video data.

Appendix A shows the syntax elements present in a high-level syntax packet of FIG. 14A; and Appendix B shows the syntax elements present in a slice header packet of FIGS. 14A and 14B.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

Figure 1:
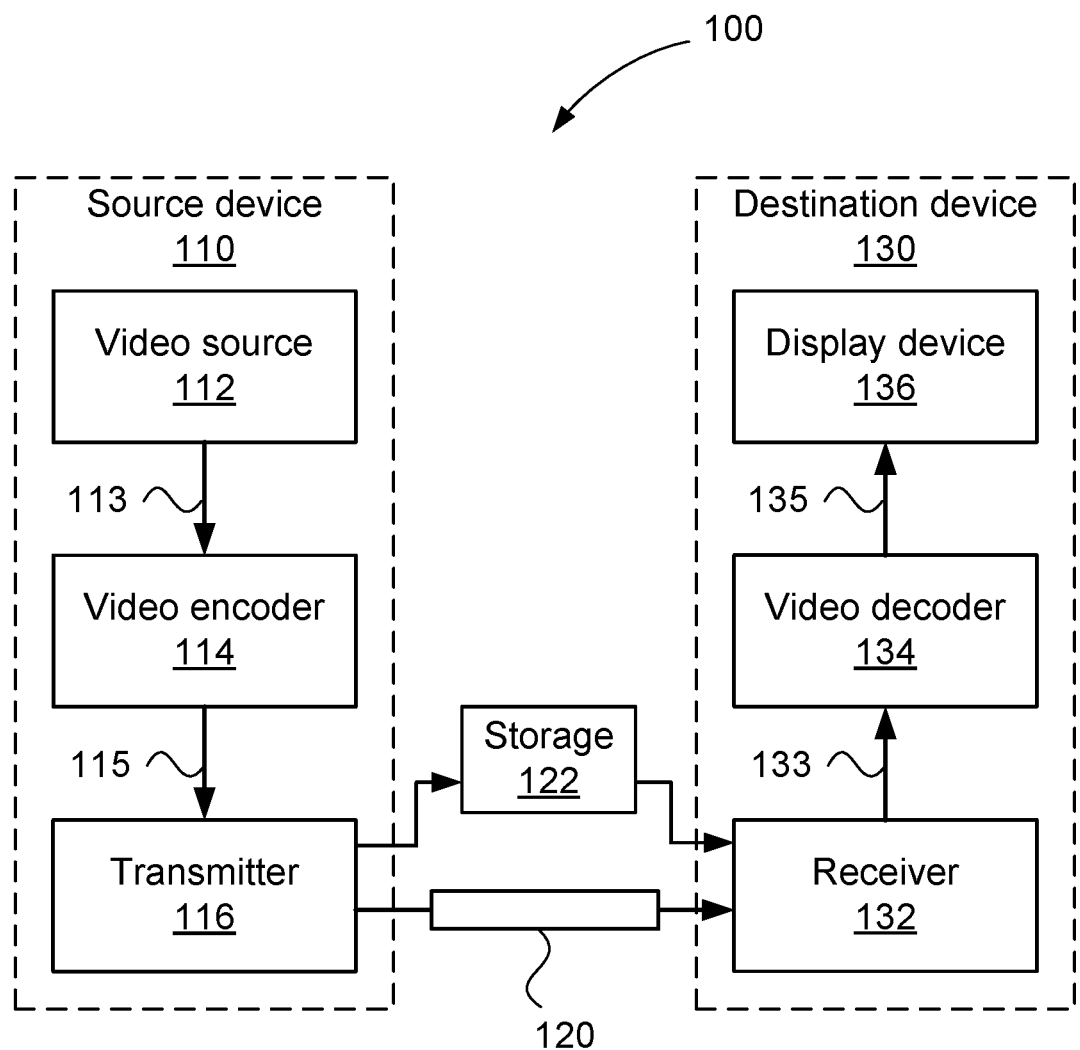
FIG. 1 is a schematic block diagram showing a sub-frame latency video encoding and decoding system.

FIG. 1 is a schematic block diagram showing function modules of a sub-frame latency video encoding and decoding system 100. The system 100 may use a rate control and buffer management mechanism to ensure delivery of portions of a frame by video encoder 114 within a timeframe that allows video decoder 134 to deliver decoded frame data in real time.

The rate control and buffer management mechanism ensures that no buffer underruns and resulting failure to deliver decoded video occur (e.g. due to variations in the complexity and time taken for encoder searching of possible modes) of the incoming video data to the video encoder 114), so that decoded video frames from the video decoder 134 are delivered according to the timing of the interface over which the video frames are delivered. The interface over which the video frames are delivered may be, for example, SDI. Interfaces such as SDI have sample timing synchronised to a clock source, with horizontal and vertical blanking periods. As such, samples of the decoded video need to be delivered in accordance with the frame timing of the SDI link. Video data formatted for transmission over SDI may also be conveyed over Ethernet, e.g. using methods as specified in SMPTE ST. 2022-6. In the event that samples were not delivered according to the required timing, noticeable visual artefacts would result (e.g. from invalid data being interpreted as sample values by the downstream device). Accordingly, the rate control mechanism ensures that no buffer overruns and resulting inability to process incoming video data occur. A similar constraint exists for the inbound SDI link to the video encoder 114, which needs to encode samples in accordance with arrival timing and may not stall incoming video data to the video encoder 114 (e.g. due to varying processing demand for encoding different regions of a frame).

As mentioned previously, the video encoding and decoding system 100 has a latency of less than one frame of video data. In particular, some applications require latencies as low as 32 lines of video data from the input of the video encoder 114 to the output of the video decoder 134. The latency may include time taken during input/output of video data and storage of partially-coded video data prior to and after transit over a communications channel. Generally, video data is transmitted and received in raster scan order (e.g. over an SDI link). However, the video encoding and decoding system 100 processes video data in coding tree units "CTUs". Each frame is divided into an array of square-shaped CTUs. As such, each CTU includes a fixed number of samples, and each sample requires a fixed number of bits. For example, an 8×8 CTU with 8-bit samples using the 4:4:4 chroma format requires 8*8*8*3=1536 bits in uncompressed form.

The size of a compressed CTU varies greatly, depending on the ability of the video encoder 114 to compress the uncompressed CTU data. As each CTU is encountered, the compressed size can vary greatly, due to changes in the statistics of the uncompressed video data. As such, it is not possible to simply force each CTU to compress to a fixed size, matching the defined compression ratio of the video encoding and decoding system 100.

A visually lossless quality level may be maintained by allowing CTUs to exceed the target compressed size on occasion. Allowing CTUs to exceed the target compressed size on occasion is achieved by decoupling the compressed CTU data (e.g. using a 'first-in first-out' (FIFO) buffer). The degree of decoupling (e.g. the FIFO size) sets the degree of local variance in CTU size from the constraint on the compressed bitstream size. This form of operation is known as a 'constant bit-rate' (CBR) operation.

In a CBR operation, if the bitstream fails to achieve the required ('mandated') compression ratio (i.e. is larger than the size implied by the compression ratio) the bitstream is considered invalid. As a result, the video encoder 114 targets a compression ratio slightly below the target implied by the compression ratio, to allow for local variance in CTU coding cost (e.g. when completing the compression operation). Moreover, the video data is not generally compressed into one continuous run of data. Instead, the video data is divided into smaller units for processing (e.g. frames, or even portions of frames). The subdivision permits parallel processing implementations to operate independently on each smaller unit of the video data. However, each smaller unit of the video data needs to independently meet the compression ratio, increasing the overhead due to the slight underutilisation of the space afforded to each smaller unit of the video data.

The video encoder 114 requires all samples in a given CTU before encoding of that CTU can begin. The system 100 includes a source device 110 and a destination device 130. A communication channel 120 is used to communicate encoded video information from the source device 110 to the destination device 130. In some arrangements, the source device 110 and destination device 130 may comprise respective broadcast studio equipment, such as overlay insertion and real-time editing module, in which case the communication channel 120 may be an SDI link. In general, the communication channel 120 is a 'CBR' channel. As such, the communication channel 120 affords a fixed limit on available bandwidth. For uncompressed video data, the bandwidth of the communication channel 120 is simply set to match that of the uncompressed video data. For compressed video data, the required bandwidth generally varies temporally, as each CTU varies in size (in bits) in compressed form. When delivering a stream of compressed CTUs over a CBR channel, the latency of each CTU is thus affected by the cumulative sizes of preceding compressed CTUs vs the bandwidth afforded by the communications channel 120. As the video decoder 134 needs to deliver CTUs in real-time, the degree of latency is limited, and the timing is set to afford the worst-case latency. The communications channel 120 may utilise an interface intended for conveying uncompressed data, such as SDI or HDMI, even though in the system 100, compressed data is conveyed.

In other arrangements, the source device 110 and destination device 130 may comprise a graphics driver as part of a system-on-chip (SOC) and an LCD panel (e.g. as found in a smart phone, tablet or laptop computer), in which case the communication channel 120 is typically a wired channel, such as PCB trackwork and associated connectors. Moreover, the source device 110 and the destination device 130 may comprise any of a wide range of devices, including devices supporting over the air television broadcasts, cable television applications, internet video applications and applications where encoded video data is captured on some storage medium or a file server. The source device 110 may also be a digital camera capturing video data and outputting the video data in a compressed format offering visually lossless compression, as such the performance may be considered as equivalent to a truly lossless format (e.g. uncompressed).

As shown in FIG. 1, the source device 110 includes a video source 112, the video encoder 114 and a transmitter 116. The video source 112 typically comprises a source of uncompressed video data 113, such as an imaging sensor, a previously captured video sequence stored on a non-transitory recording medium, or a video feed from a remote imaging sensor. The uncompressed video data 113 is conveyed from the video source 112 to the video encoder 114 over a CBR channel, with fixed timing of the delivery of the video data. Generally, the video data is delivered in a raster scan format, with signalling to delineate between lines ('horizontal sync') and frames ('vertical sync'). The video source 112 may also be the output of a computer graphics card, such as displaying the video output of an operating system and various applications executing upon a computing device (e.g. a tablet computer). Such content is an example of 'screen content'. Examples of source devices 110 that may include an imaging sensor as the video source 112 include smart-phones, video camcorders and network video cameras. The video encoder 114 converts the uncompressed video data 113 from the video source 112 into encoded video data and will be described further with reference to FIG. 3.

The video encoder 114 encodes the incoming uncompressed video data 113. The video encoder 114 is required to process the incoming sample data in real-time. Hence, the video encoder 114 is not able to stall the incoming uncompressed video data 113, for example, if the rate of processing the incoming data were to fall below the input data rate. The video encoder 114 outputs compressed video data 115 (the 'bitstream') at a constant bit rate. In a video streaming application, the entire bitstream is not stored in any one location. Instead, the blocks of compressed video data are continually being produced by the video encoder 114 and consumed by the video decoder 134, with intermediate storage, e.g., in the (CBR) communication channel 120. The CBR stream compressed video data is transmitted by the transmitter 116 over the communication channel 120 (e.g. an SDI link). It is also possible for the compressed video data to be stored in a non-transitory storage device 122, such as a "Flash" memory or a hard disk drive, until later being transmitted over the communication channel 120, or in-lieu of transmission over the communication channel 120.

The destination device 130 includes a receiver 132, a video decoder 134 and a display device 136. The receiver 132 receives encoded video data from the communication channel 120 and passes received video data to the video decoder 134. The video decoder 134 then outputs decoded frame data to the display device 136. Examples of the display device 136 include a cathode ray tube, a liquid crystal display (such as in smart-phones), tablet computers, computer monitors or in stand-alone television sets. It is also possible for the functionality of each of the source device 110 and the destination device 130 to be embodied in a single device, examples of which include mobile telephone handsets and tablet computers.

Figure 2A:
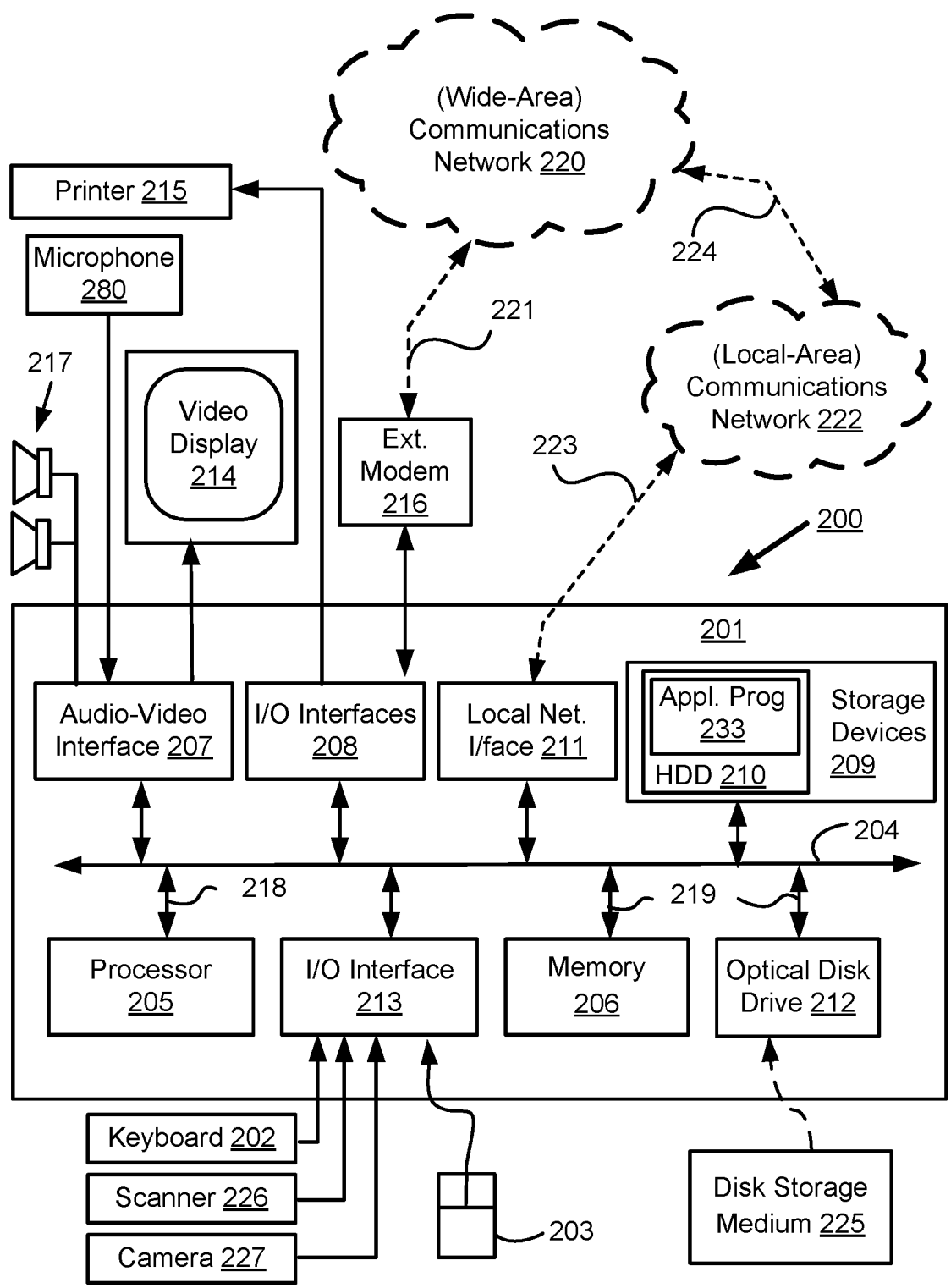
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes a number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card and provides an example of 'screen content'. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu-ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 130 of the system 100, or the source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200 wherein the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
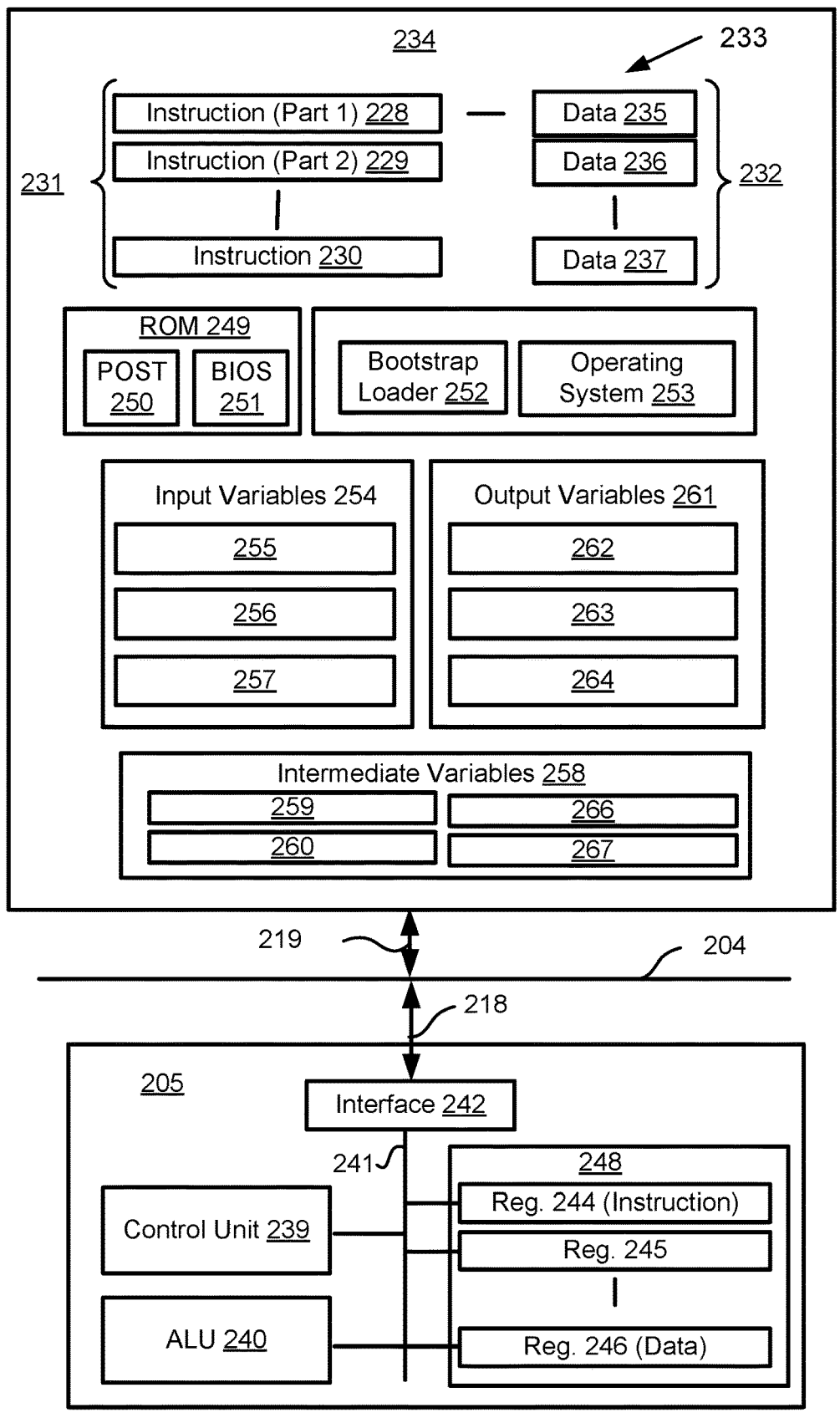

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A need to be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 11:
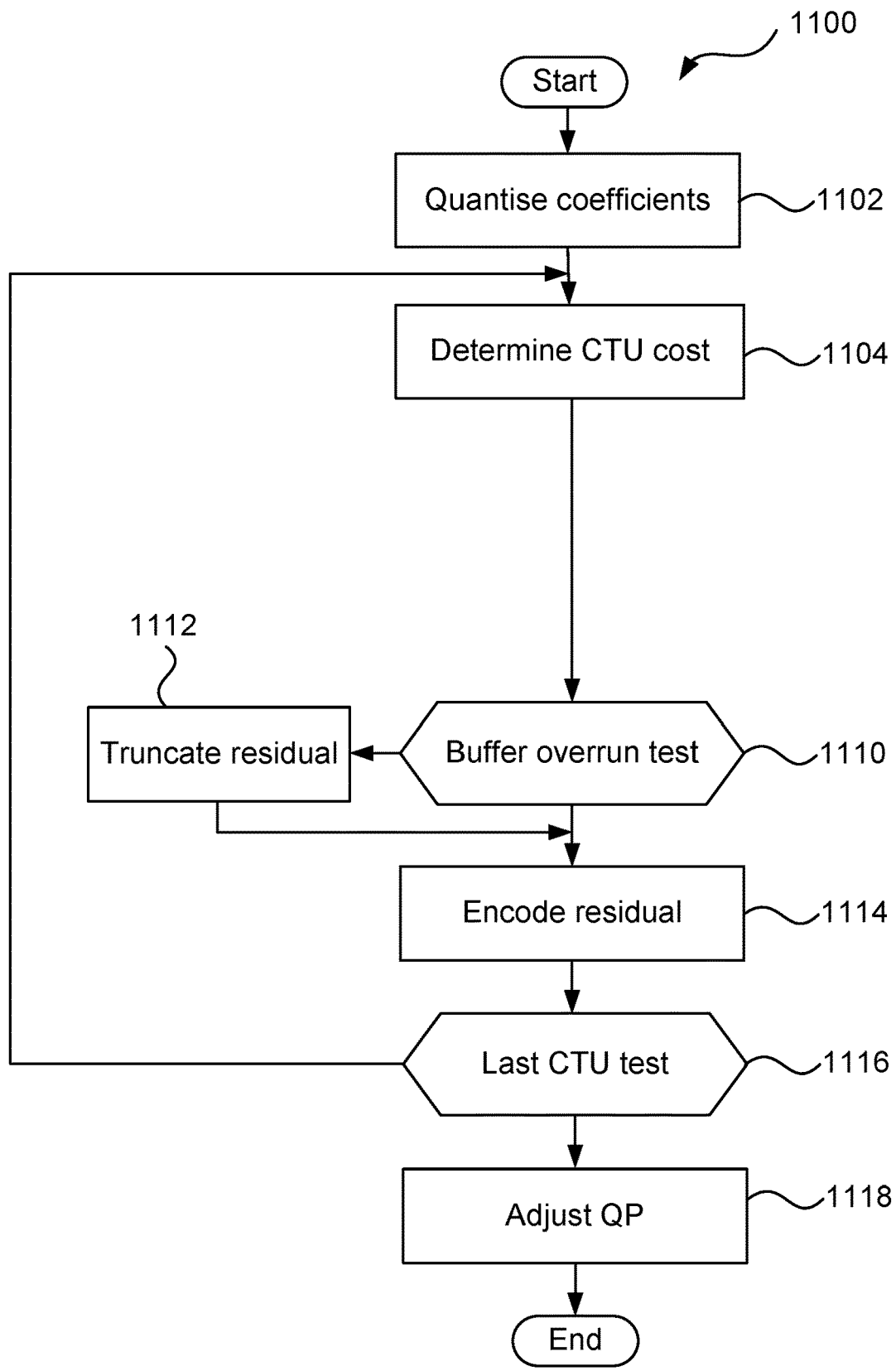
FIG. 11 is a schematic flow diagram showing a method of truncating residual data in a coding tree unit to prevent a buffer overrun in the video encoder.

Each step or sub-process in the method of FIG. 11, to be described, is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 3A:
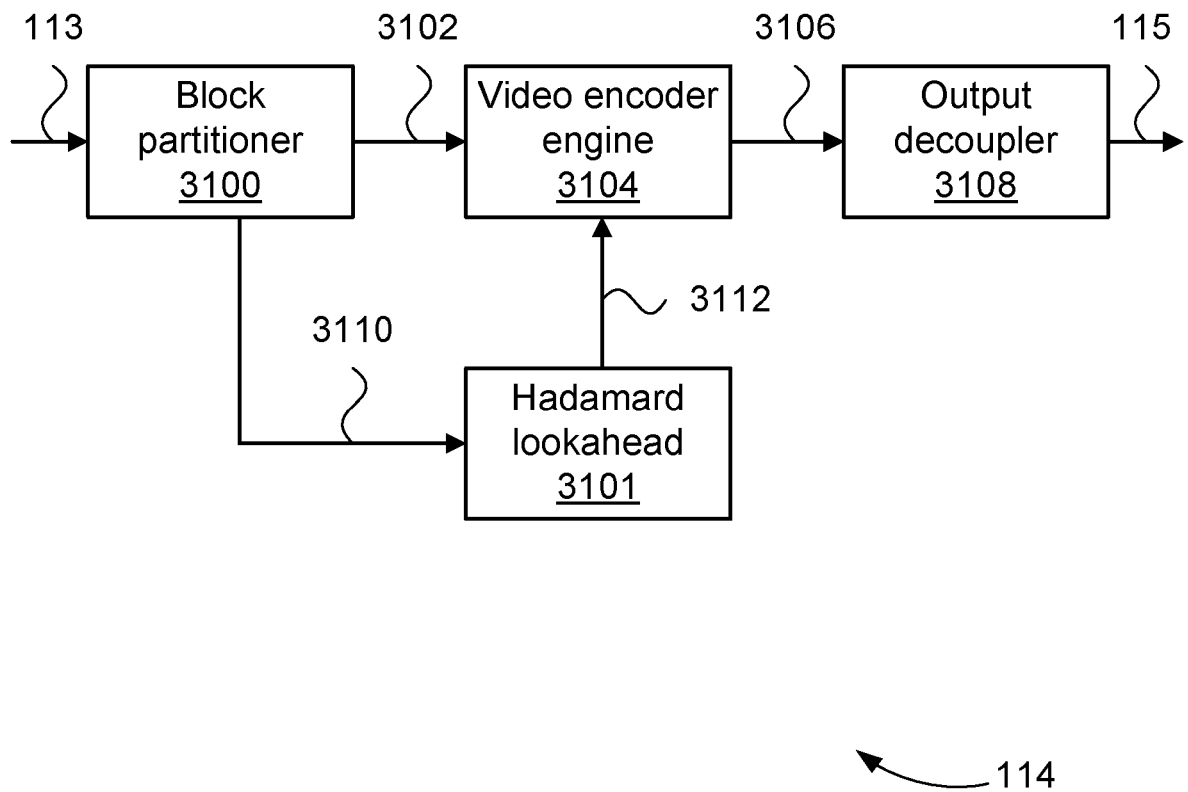
FIG. 3A is a schematic block diagram showing functional modules of a video encoder.
Figure 3B:
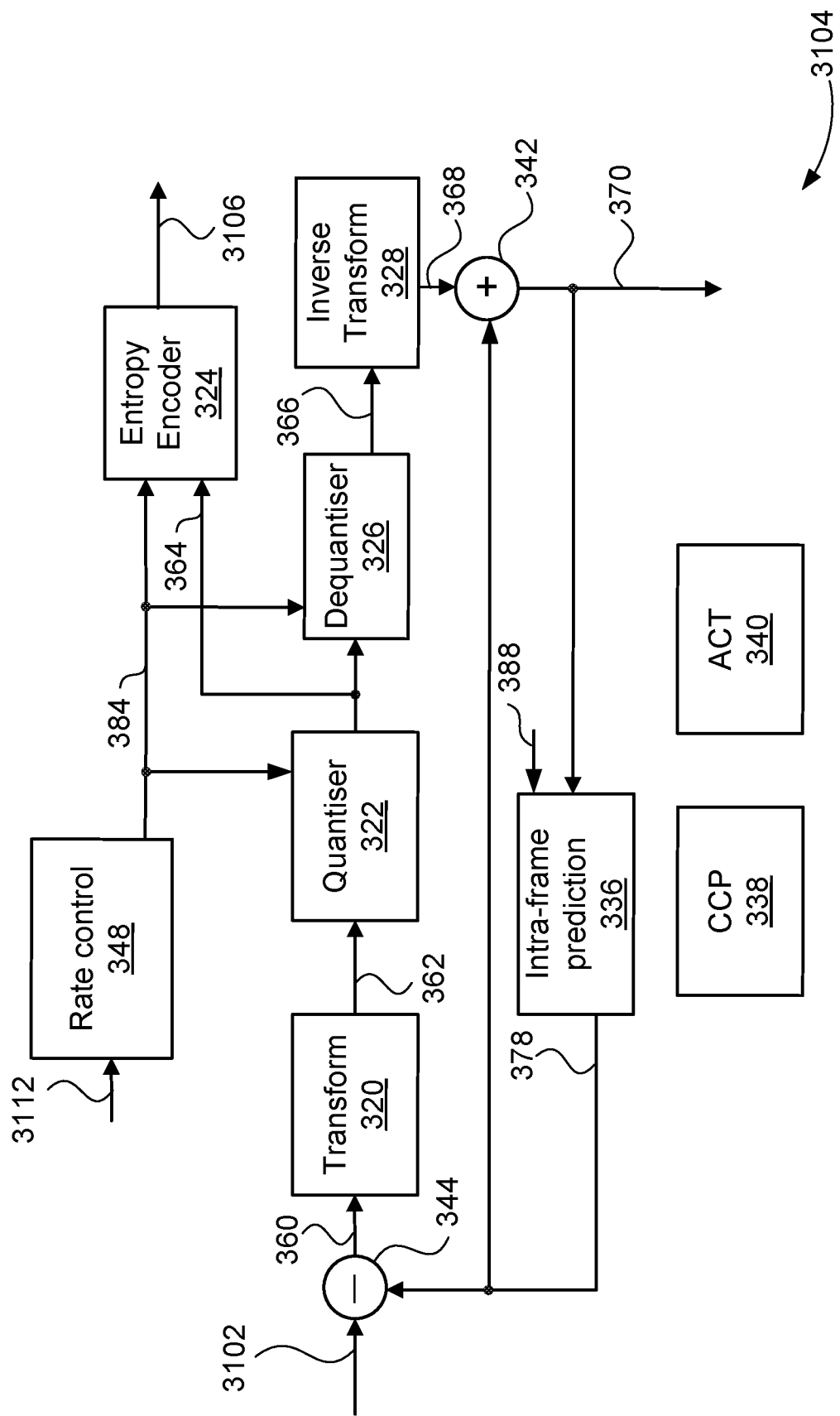
FIG. 3B is a schematic block diagram showing functional modules of a video encoder engine.
Figure 4A:
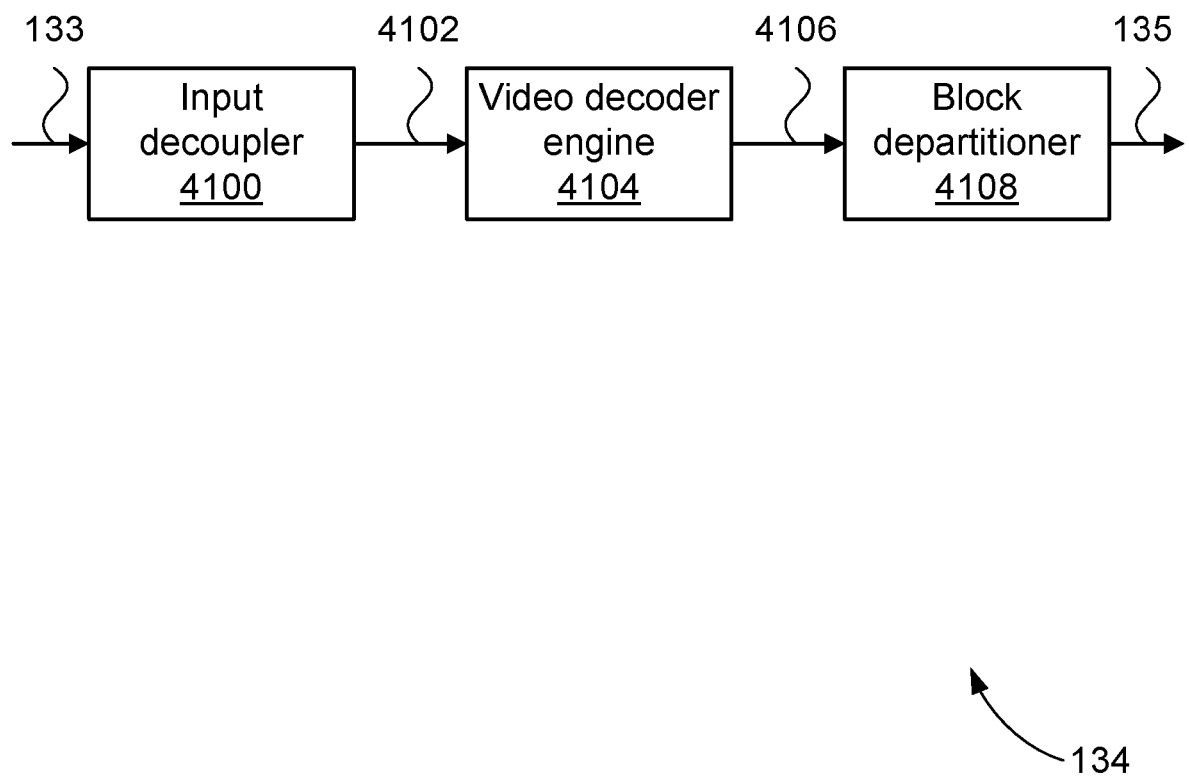
FIG. 4A is a schematic block diagram showing functional modules of a video decoder.
Figure 4B:
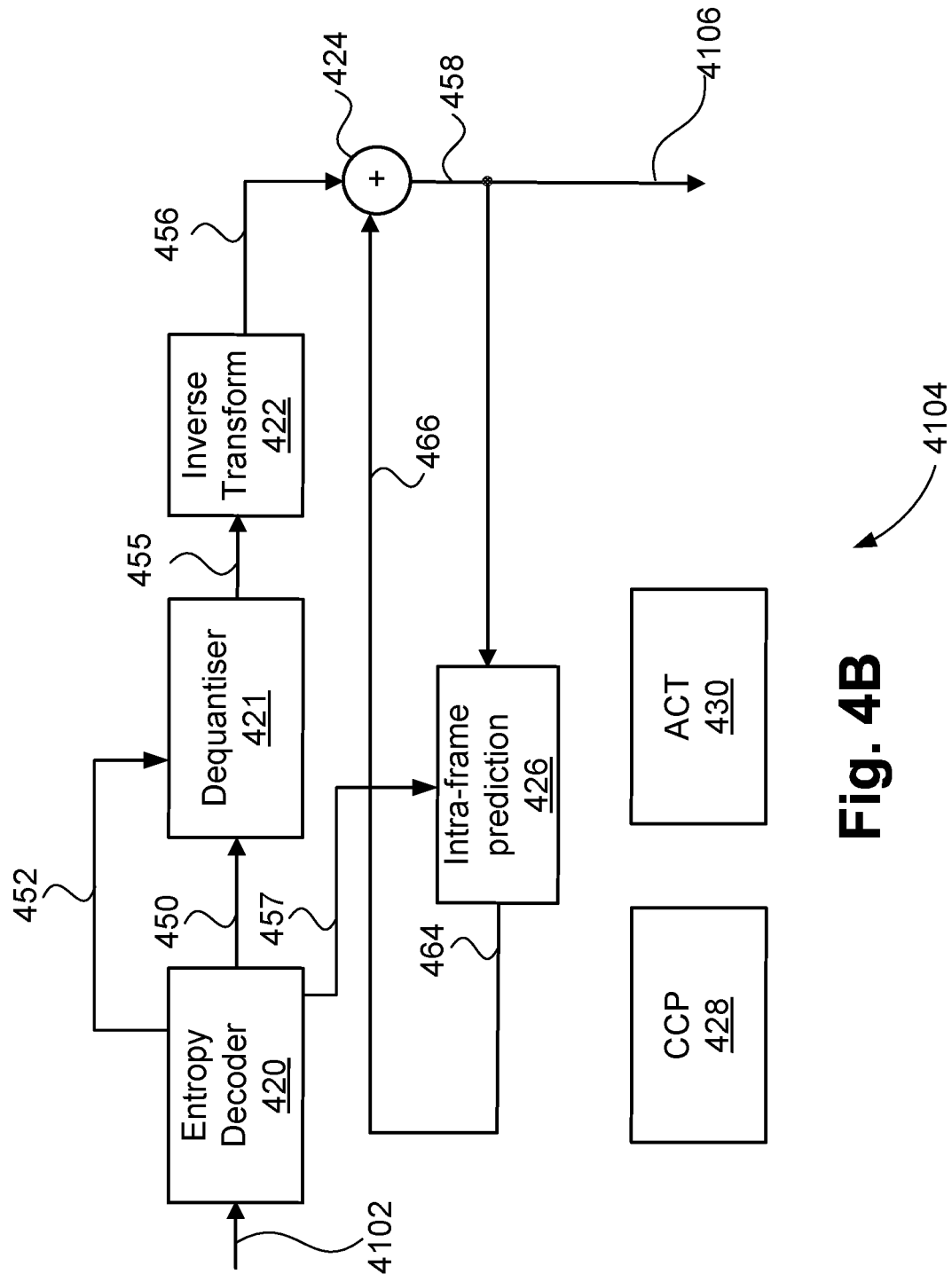
FIG. 4B is a schematic block diagram showing functional modules of a video decoder engine.

FIG. 3A is a schematic block diagram showing functional modules of the video encoder 114. FIG. 3B is a schematic block diagram showing functional modules of a video encoder engine 3104. FIG. 4A is a schematic block diagram showing functional modules of the video decoder 134. FIG. 4B is a schematic block diagram showing functional modules of a video decoder engine 4104. Generally, data is passed between functional modules within the video encoder 114 and the video decoder 134 in blocks or arrays (e.g., blocks of samples or blocks of transform coefficients). Where a functional module is described with reference to the behaviour of individual array elements (e.g., samples or transform coefficients), the behaviour shall be understood to be applied to all array elements. The video encoder 114 and video decoder 134 may be implemented using a general-purpose computer system 200, as shown in FIGS. 2A and 2B. The various functional modules may be implemented by dedicated hardware within the computer system 200 using software executable within the computer system 200 such as one or more software code modules of the software application program 233 resident on the hard disk drive 205 and being controlled in its execution by the processor 205. Alternatively, the various functional modules may be implemented by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processors, digital signal processors, application specific integrated circuits (ASICs), field programmable gate arrays (FPGAs) or one or more microprocessors and associated memories. In particular the video encoder 114 comprises modules 320-348 and the video decoder 134 comprises modules 420-432 which may each be implemented as one or more software code modules of the software application program 233, or an FPGA 'bitstream file' that configures internal logic blocks in the FPGA to realise the video encoder 114 and the video decoder 134.

Although the video encoder 114 of FIG. 3 is an example of a low latency video encoding pipeline, other video codecs may also be used to perform the processing stages described herein. The video encoder 114 receives captured frame data, such as a series of frames, each frame including one or more colour channels.

A block partitioner 3100 stores the received uncompressed video data 113 into a buffer, such as a 'ping pong' buffer. The buffer is divided into sections, one section is used for receiving the uncompressed video data 113 and another section is used for conveying block data 3102 to the video encoder engine 3104. The block data 3102 is in the form of uncompressed CTUs (8×8 pixel blocks). Thus, the block partitioner 3100 converts the uncompressed video data 113 into blocks. Each section in the buffer has the capacity to store one row of CTUs in the frame.

The term "coding tree unit" (CTU) refers collectively to all colour channels of the frame. Every coding tree unit (CTU) includes one coding tree block (CTB) for each colour channel. For example, in a frame coded using the YCbCr colour space, a coding tree unit (CTU) consists of tree coding tree blocks (CTBs) for Y, Cb and Cr colour planes corresponding to the same spatial location in the picture. The size of individual coding tree blocks (CTBs) may vary across colour components and generally depends on the selected 'chroma format'. For example, for the 4:4:4 chroma format, the sizes of the coding tree blocks (CTBs) will be the same. For the mode 4:2:0 chroma format, the dimensions of chroma coding tree blocks (CTBs) in samples are halved (both horizontally and vertically) relative to the size of the luma coding tree block (CTB). The size of a coding tree unit (CTU) is specified as the size of the corresponding luma coding tree block (CTB). The sizes of the chroma coding tree blocks (CTBs) are inferred from the size of the coding tree unit (CTU) and the chroma format.

Each coding tree unit (CTU) includes a hierarchical quad-tree subdivision of a portion of the frame with a collection of 'coding units' (CUs), such that at each leaf node of the hierarchical quad-tree subdivision one coding unit (CU) exists. The subdivision can be continued until the coding units (CU) present at the leaf nodes have reached a specific predetermined minimum size. The specific minimum size is referred to as a smallest coding unit (SCU) size. Generally, the smallest coding unit (SCU) size is 8×8 luma samples, but other sizes are also possible, such as 16×16 or 32×32 luma samples.

For low latency video coding, smaller CTUs are desirable, as the resulting smaller blocks require fewer raster-scanned lines to be buffered prior to block partitioning and less buffering after decoding for conversion to/from line-based raster scan input/output of samples. Thus, a CTU size of 8×8 is used for a system 100 required to have an end-to-end latency not exceeding 32 raster lines. The corresponding coding block (CB) for the luma channel has the same dimensions as the coding unit (CU). The corresponding coding blocks (CBs) for the chroma channels have dimensions scaled according to the chroma format. If no subdivision of a coding tree unit (CTU) is done and a single coding unit (CU) occupies the whole coding tree unit (CTU), such a coding unit (CU) is referred to as a largest coding unit (LCU) (or maximum coding unit size). These dimensions are also specified in units of luma samples. As a result of the quad-tree hierarchy, the entirety of the coding tree unit (CTU) is occupied by one or more coding units (CUs). The largest coding unit size is signalled in the bitstream for a collection of frames known as a coded video sequence. For a given frame, the largest coding unit (LCU) size and the smallest coding unit (SCU) size do not vary.

The video encoder engine 3104 produces a stream of variable-length syntax elements 3106, forming the compressed representation of each CTU. As the size of each compressed CTU may vary, the bandwidth of the stream of variable-length syntax elements 3106 is variable. A variable bandwidth is not directly suitable for transmission over the CBR communications channel 120 because it is not possible to stall the video encoder engine 3104 if a burst of excessively high bandwidth syntax elements are produced. Hence, an output decoupler 3108 is used to enable accommodation of local bursts. The output decoupler 3108 is generally a 'first-in first-out' (FIFO) buffer. The size of the FIFO sets the degree to which bursts exceeding the CBR of the communication channel 120 can be accommodated. The video encoder engine 3104 is able to modulate the size of each compressed CTU so that the mandated compression ratio is not exceeded. In addition to this, the video encoder engine 3104 modulates the size of each compressed CTU so that local variation in compressed CTU cost does not result in the output decoupler 3108 overflowing or underflowing.

Again, due to the realtime nature of the described system, it is not possible to stall processing stages to wait for overflow or underflow conditions to resolve. Instead, it is necessary for processing stages to be configured so that such conditions do not occur. Moreover, the timing of each processing stage is fixed, as the timing of availability of the data blocks 3102 is linked to the raster scan timing of the uncompressed video data 113, which cannot be altered. To assist the video encoder engine 3104 in modulating the cost of each compressed CTU, a Hadamard lookahead module 3101 is used. The Hadamard lookahead module 3101 produces Hadamard costs 3112 that are supplied to the video encoder engine 3104 to assist with the rate control operation. The Hadamard lookahead module 3101 also reads the block data 3102 and determines an estimate of the complexity of the each block of uncompressed data, e.g. using a Hadamard transform. By 'looking ahead' a fixed number of blocks ('the lookahead window') beyond the block being processed in the video encoder engine 3104, the Hadamard cost of the block to be processed by the video encoder engine 3104 can be compared with the Hadamard cost of other blocks in the lookahead window. Then, a relative indication of the cost of the blocks may be obtained. This can be scaled against the targeted cost of the compressed form of each block to produce a target for the considered block. The target can be compared with the actual cost of the just-coded block, and the cost of future blocks can be modulated by altering a 'quantisation parameter'.

The video encoder engine 3104 produces one or more 'prediction units' (PUs) for each coding block (CU). A PU includes all colour channels and is divided into one prediction block (PB) per colour channel. Various arrangements of prediction units (PUs) in each coding unit (CU) are possible and each arrangement of prediction units (PUs) in a coding unit (CU) is referred to as a 'partition mode'. It is a requirement that the prediction units (PUs) do not overlap and that the entirety of the coding unit (CU) is occupied by the one or more prediction units (PUs). Such a requirement ensures that the prediction units (PUs) cover the entire frame area. A partitioning of a coding unit (CU) into prediction units (PUs) implies subdivision of coding blocks (CBs) for each colour component into 'prediction blocks' (PBs). Depending on used chroma format, the sizes of prediction blocks (PBs) corresponding to the same coding unit (CU) for different colour component may differ in size. For coding units (CUs) configured to use intra-prediction, two partition modes are possible, known as 'PART_2N×2N' and 'PART_N×N'. The PART 2N×2N partition mode results in one prediction unit (PU) being associated with the coding unit (CU) and occupying the entirety of the coding unit (CU). The PART_N×N partition mode results in four prediction units (PUs) being associated with the coding unit (CU) and collectively occupying the entirety of the coding unit (CU) by each occupying one quadrant of the coding unit (CU).

With reference to FIG. 3B, the video encoder engine 3104 operates by generating a prediction unit (PU) 378. When intra-prediction is used, a transform block (TB)-based reconstruction process is applied for each colour channel. The TB-based reconstruction process results in the prediction unit (PU) 378 being derived on a TB basis. As such, a residual quad-tree decomposition of the coding unit (CU) associated with the prediction unit (PU) indicates the arrangement of transform units (TUs), and hence TBs, to be reconstructed to reconstruct the PU 378. A difference module 344 produces a 'residual sample array' 360. The residual sample array 360 is the difference between the PU 378 and a corresponding 2D array of data samples from a coding unit (CU) of the coding tree block (CTB) of the uncompressed video data 3102. The difference is calculated for corresponding samples at each location in the array. The transform module 320 may apply a forward DCT to transform the residual sample array 360 into the frequency domain, producing 'transform coefficients'. An 8×8 CU is always divided into an 8×8 TU, and an 8×8 TU may include one 8×8 transform block per colour channel, or a subdivision of four 4×4 transform blocks per colour channel. Moreover, each transform block may result in the application of a DCT, or the transform may be skipped. The option to skip the transform is available for both the 4×4 TBs and the 8×8 TBs. Experiments show that transform skip for 8×8 blocks is beneficial especially for some screen content cases.

Within the TU, individual TBs are present and TB boundaries do not cross PB boundaries. As such, when the coding unit (CU) is configured to use a PART_N×N partition mode, the associated residual quad-tree (RQT) is inferred to have a subdivision at the top level of the hierarchy of subdivisions, resulting in four 4×4 TBs being associated with the luma channel of the CU. A rate control module 348 ensures that the bit rate of the encoded data meets a predetermined constraint. The rate control module 348 receives the Hadamard costs 3112 from the Hadamard lookahead module 3101. The predetermined constraint resulting from the compression ratio may be referred to as a rate control target. As the quantity of bits required to represent each CU varies, the rate control target can only be met by averaging across multiple CUs. Moreover, each run of CTUs (or 'CTU row') forms a 'slice segment' and the size allocated to each slice segment is fixed. The fixed size allocated to each slice segment facilitates architectures using parallelism, as it becomes possible to determine the start location of each slice segment without having to search for markers in the bitstream. The encoder may also encode multiple slice segments with some degree of parallelism (e.g. in staggered fashion), storing the slice segments progressively in the allocated portions of the bitstream as the slice segments are produced. The predetermined constraint may be determined by the capacity of the communications channel 120, or some other requirement. For example, the predefined constraint is for operation at a 'constant bit rate' (CBR). As such, the encoder rate control target may be determined according to a constant bit rate channel capacity for a target communication channel (e.g., the channel 120) to carry video data containing a video frame.

The constraint operates at a sub-frame level, and, due to channel rate limitations and intermediate buffer size limitations, also imposes timing constraints on the delivery of blocks of compressed video data by the video encoder 114. In particular, to ensure the fixed size requirement of each slice is met, the cumulative cost of the CTUs within each slice must not exceed the fixed size requirement. The cost may be less than the fixed size requirement. For example, the timing constraints are described below with reference to FIGS. 6A and 6B. The rate control module may also influence the selection of prediction modes and/or partition modes within the video encoder 114, as described below with reference to the method 1200 of FIG. 12A.

A quantisation parameter (QP) 384 is output from the rate control module 348. The QP 384 varies on a block by block basis as the frame is being encoded. In particular, the QP 384 is signalled using a 'delta QP' syntax element, signalled at most once per TU, which may correspond to once per CTU. Delta QP is only signalled when at least one significant residual coefficient is present for the TU. Other methods for controlling the QP 384 are also possible. The QP defines a divisor applied by a quantiser module 322 to the transform coefficients 362 to produce residual coefficients 364. The remainder of the division operation in the quantiser module 322 is discarded. Lower QPs result in larger magnitude residual coefficients but with a smaller range of remainders to discard. As such, lower QPs give a higher quality at the video decoder 134 output, at the expense of a lower compression ratio.

The compression ratio is influenced by a combination of the QP 384 and the magnitude of the transform coefficients 362. The magnitude of the transform coefficients 362 relates to the complexity of the incoming uncompressed video data and the ability of the selected prediction mode to predict the contents of the uncompressed video data. Thus, overall compression efficiency is only indirectly influenced by the QP 384 and varies along each slice segment as the complexity of the data at each block varies. The residual coefficients 364 are an array of values having the same dimensions as the residual sample array 360. The residual coefficients 364 provide a frequency domain representation of the residual sample array 360 when a transform is applied. The residual coefficients 364 and determined quantisation parameter 384 are taken as input to a dequantiser module 326.

In addition, the relative impact of the QP 384 can be attenuated on a coefficient-by-coefficient basis with the application of scaling matrices. A scaling matrix is defined for an 8×8 TB in accordance with the HEVC specification, known as a 'default scaling matrix'. The general property of the default scaling matrices is to have a larger quantisation step size for higher-frequency residual coefficients (lower right in the TB), compared to the quantisation step size of the lower-frequency residual coefficients (upper left in the TB). This exploits the reduction in sensitivity in the human eye for colour mismatches in regions of high detail (e.g. plant foliage) as opposed to gradually changing regions (e.g. sky, clouds). Then, a coding gain can be achieved with little impact subjectively. However, there is a loss in objective metrics such as PSNR to correspond with the rate reduction from the change in quantisation. For 4×4 TBs, scaling matrices are not applied to transform-skipped blocks, as the application of scaling matrices (a frequency-domain operation) is only meaningful for transformed blocks. A scaling matrix for 4×4 TBs is provided by subsampling the default scaling matrix for the 8×8 TB. For the system 100 that uses only 4×4 and 8×8 blocks, the availability of scaling matrices in the commonly used transformed 4×4 block case, while not affecting the transform-skipped 4×4 block case, is beneficial.

The dequantiser module 326 reverses the scaling performed by the quantiser module 322 to produce rescaled transform coefficients 366. The rescaled transform coefficients are rescaled versions of the residual coefficients 364. The residual coefficients 364 and the determined quantisation parameter 384 are also taken as input to an entropy encoder module 324. The entropy encoder module 324 encodes the values of the transform coefficients 364 to produce variable-length syntax elements 3106. Due to the loss of precision resulting from the operation of the quantiser module 322, the rescaled transform coefficients 366 are not identical to the original values present in the transform coefficients 362. The rescaled transform coefficients 366 from the dequantiser module 326 are then output to an inverse transform module 328. The inverse transform module 328 performs an inverse transform from the frequency domain to the spatial domain to produce a spatial-domain representation 368 of the rescaled transform coefficients 366. The spatial-domain representation 368 is substantially identical to a spatial domain representation that is produced at the video decoder 134. The spatial-domain representation 368 is then input to a summation module 342.

Prediction units (PUs) may be generated using an intra-prediction method. Intra-prediction methods make use of data samples adjacent to the prediction unit (PU) that have previously been reconstructed (typically above and to the left of the prediction unit) in order to generate reference data samples within the prediction unit (PU). Five angular intra-prediction modes are available (horizontal, vertical and three diagonal modes). Additionally, a 'DC mode' and a 'planar mode' are also available for intra-prediction, to give a total of seven available intra-prediction modes. An intra-prediction mode 388 indicates which one of the seven available intra-prediction modes is selected for the current prediction unit (PU) when the prediction unit (PU) is configured to use intra-prediction. The summation module 342 produces the reconstructed samples 370 that are passed to the intra prediction module 336, for reference when predicting future prediction blocks. Standards such as HEVC specify filtering stages, such as sample adaptive offset (SAO) or deblocking. Such filtering is generally beneficial (e.g. for removing blocking artefacts), at the higher compression ratios (e.g. 50:1 to 100:1) typically seen in applications such as distribution of compressed video data across the internet to households, or broadcast. The video encoder 114 does not perform filtering operations such as adaptive loop filter, SAO or deblocking filtering. The video encoder 114 is intended for operation at lower compression ratios (e.g. 4:1 to 6:1 or even 8:1). At such compression ratios, these additional filtering stages have little impact on the frame data, and thus the complexity of the additional filtering operations is not justified by the resulting small improvement in quality.

The intra-frame prediction module 336 produces an intra-predicted prediction unit (PU) 378 using reconstructed samples 370 obtained from the summation module 342. In particular, the intra-frame prediction module 336 uses samples from neighbouring blocks (i.e. above, left or above-left of the current block) that have already been reconstructed to produce intra-predicted samples for the current prediction unit (PU). When a neighbouring block is not available (e.g. at the frame or independent slice segment boundary) the neighbouring samples are considered as 'not available' for reference. In such cases, a default value is used instead of the neighbouring sample values. Typically, the default value (or 'half-tone') is equal to half of the range implied by the bit-depth. For example, when the video encoder 114 is configured for a bit-depth of eight (8), the default value is 128. The summation module 342 sums the prediction unit (PU) 378 from the intra-frame prediction module 336 and the spatial domain output of the inverse transform module 328.

The entropy encoder 324 encodes the transform coefficients 364, the QP 384 and other parameters, collectively referred to as 'syntax elements', as variable-length syntax elements 3106. At targeted compression ratios of 4:1 to 8:1, the data rates for video data at UHD resolutions are very high. At such data rates, methods such as arithmetic coding, in particular the context adaptive binary arithmetic coding (CABAC) algorithm of HEVC, are not feasible. One issue is that the use of adaptive contexts requires large memory bandwidth to the context memory for updating the probability associated with each context-coded bin in a syntax element. Another issue is the inherently serial nature of coding and decoding each bin into the bitstream. Even bins coded as so-called 'equi-probable' or 'bypass-coded' bins have a serial process that limits parallelism to only a few bins per clock cycle. At compression ratios such as 4:1 to 8:1, the bin rate is extremely high. For example at UHD 4:4:4 10-bit sixty (60) frame per second video data, the data rate is 14.93 Gb/s uncompressed, so the compressed data rates between 1.866 to 3.732 Gb/s can be expected. Hence, in the video processing system 100, the use of adaptive probabilities for coding of bins is disabled. Consequently, all bins are coded in the "equi-probable state" (i.e. bin probabilities equally assigned between '0' bins and '1' bins). As a consequence, there is alignment between bins and bits in the variable-length syntax elements 3106, which results in the ability to directly code bins into the bitstream and read bins from the bitstream as bits. Then, the encoded bitstream effectively contains only variable length and fixed length codewords, each codeword including an integer number of (equi-probable) bits. The absence of misalignment between (bypass coded) bins and bits simplifies the design of the entropy encoder 324, as the sequence of bins defining a given syntax element value can be directly stored into the variable-length syntax elements 3106.

A cross-component prediction (CCP) module 338 attempts to exploit remaining correlations between the residual of the luma TB and the residuals of each of the chroma TBs. The CCP module 338 generates two $\alpha$ values, each used to produce a chroma residual prediction from the luma residual. The chosen $\alpha$ values are coded into the bitstream.

An adaptive colour transform (ACT) module 340 also attempts to exploit correlations between colour channels. The ACT module 340 optionally performs a colour space conversion from RGB to YCoCg colour spaces. The colour conversion may be performed on each block. The video encoder engine 3104 tests application of the ACT to decide whether to apply ACT or not. This decision is signalled in the bitstream. In particular, if the incoming raster scan samples 113 use the RGB colour space, ACT is highly effective in decorrelation the signal. Moreover, the need for a colour space converter external to the video encoder 113 is avoided.

Moreover, the absence of context coded bins also removes dependencies necessary for selecting contexts for bins. Such dependencies, when present, require buffers to store the values of previously coded bins, with those values used to select one context out of a set of contexts for a current bin. Then, encoding and decoding multiple bins per clock cycle is greatly simplified compared to when adaptive context coding is used, resulting in the potential to achieve the compressed data rates mentioned previously. In such architectures, the system clock can be expected to be in the order of several hundred MHz, with busses being sufficiently wide to achieve the required data rate. All the described attributes of the entropy encoder 324 are also present in an entropy decoder 420 of the video decoder 134 which will now be described in detail with reference to FIG. 4A. The video decoder engine 4104 of FIG. 4B is described with reference to a low latency video decoding pipeline, however other video codecs may also employ the processing stages of modules 420-430. The encoded video information may also be read from memory 206, the hard disk drive 210, a CD-ROM, a Blu-ray Disk™ or other computer readable storage medium. Alternatively, the encoded video information may be received from an external source, such as a server connected to the communications network 220 or a radio-frequency receiver. The (CBR) compressed video bitstream 133 is received by an input decoupler module 4100. The input decoupler module 4100 may be a FIFO buffer. The input decoupler module 4100 enables decoupling of the CBR receipt of compressed video bitstream form the communications channel 120 and the VBR consumption of compressed video bitstream by the video decoder engine 4104. The video decoder engine 4104 outputs decoded video samples 4106, in the form of CTUs of decompressed video data. The decoded video samples 4106 are passed to a block departitioner 4108. The block departitioner receives blocks of the decoded video samples 4106, storing them in a buffer, such that once a complete row of blocks is received, the row may be read out as decoded video samples 135 in raster scan order.

As seen in FIG. 4B, received video data, such as the received compressed video bitstream 133, is input to the video decoder 134. The bitstream 133 may be read from memory 206, the hard disk drive 210, a CD-ROM, a Blu-ray Disk™ or other non-transitory computer readable storage medium. Alternatively the bitstream 133 may be received from an external source such as a server connected to the communications network 220 or a radio-frequency receiver. The bitstream 133 contains encoded syntax elements representing the captured frame data to be decoded.

After decoupling, the bitstream 4102 is input to an entropy decoder module 420 which extracts the syntax elements from the received compressed video bitstream 4102 and passes the values of the syntax elements to other blocks in the video decoder engine 4104. The entropy decoder module 420 applies variable length coding to decode syntax elements from codes present in the received compressed video bitstream 4102. The decoded syntax elements are used to reconstruct parameters within the video decoder 134. Parameters include zero or more residual data array 450, an intra-prediction mode 457, and a QP 452. The residual data array 450 and the QP 452 are passed to a dequantiser module 421, and the intra-prediction mode 457 is passed to an intra-frame prediction module 426.

The dequantiser module 421 performs inverse scaling on the residual data of the residual data array 450 to create reconstructed data 455 in the form of transform coefficients. The dequantiser module 421 outputs the reconstructed data 455 to an inverse transform module 422. The inverse transform module 422 applies an 'inverse transform' to convert the reconstructed data 455 (i.e., the transform coefficients) from a frequency domain representation to a spatial domain representation, outputting a residual sample array 456. The inverse transform module 422 performs the same operation as the inverse transform module 328. The inverse transform module 422 is configured to perform an inverse transform. The transforms performed by the inverse transform module 422 are selected from a predetermined set of transform sizes required to decode the received compressed video bitstream 4102.

If the current prediction unit (PU) was coded using intra-prediction, the intra-frame prediction module 426 produces an intra-predicted prediction unit (PU) 464 for the prediction unit (PU) according to the intra-prediction mode 457. The intra-predicted prediction unit (PU) 464 is produced using data samples spatially neighbouring the prediction unit (PU) and a prediction direction also supplied by the intra-prediction mode 457. The spatially neighbouring data samples are obtained from reconstructed samples 458, output from a summation module 424, the reconstructed samples 458 are also output as the decoded video samples 4106. The prediction unit (PU) 466 is added to the residual sample array 456 from the inverse scale and transform module 422 by the summation module 424 to produce reconstructed samples 458. The reconstructed samples 458 are output from the video decoder engine 4104 as decoded CTUs 4106. The frame buffer module 432 provides sufficient storage to hold part of one frame, as required for just in time output of decoded video data by the video decoder 134. The decoded video data may be sent to devices such as a display device (e.g. 136, 214) or other equipment within a broadcast environment, such as a 'distribution encoder', graphics overlay insertion, or other video processing apparatus.

A cross-component prediction (CCP) module 428 predicts the residual coefficients for each chroma channel from the residual coefficients of the luma channel, using a scaling factor $\alpha$. The scaling factor $\alpha$ is signalled in the bitstream. Although the use of a colour space such as YCbCr substantially decorrelates luminance from chrominance, there is still some remaining correlation and the CCP module 428 exploits this property to achieve increased coding efficiency.

An adaptive colour transform (ACT) module 430 optionally performs a transform between the YCoCg and RGB colour space. For RGB video data, this provides a substantial degree of decorrelation, and the presence of the ACT module 430 eliminates the need for an external colour transform to be applied prior to encoding and after decoding.

Figure 5:
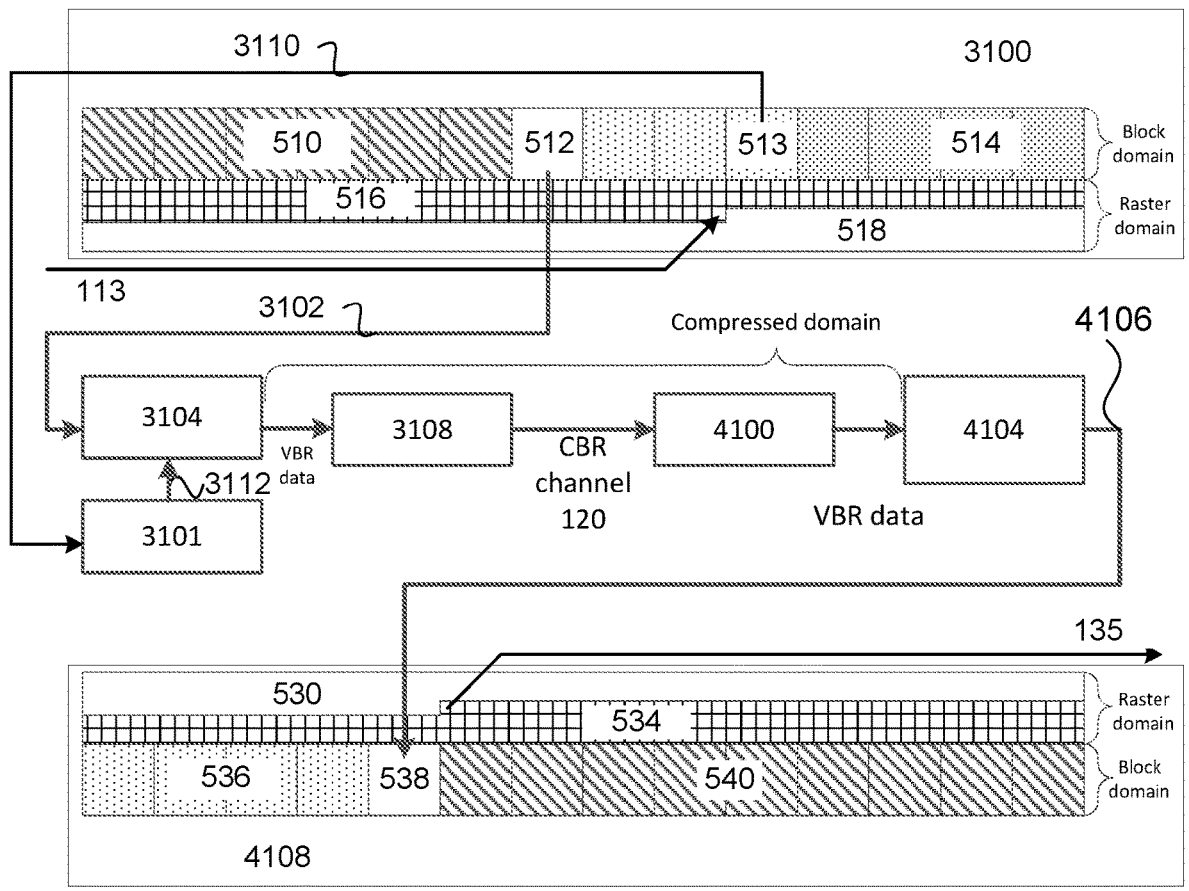
FIG. 5 is a schematic block diagram further illustrating operation of the video encoder of FIG. 3A and the video decoder of FIG. 4A.

FIG. 5 is a schematic block diagram further illustrating operation of the low-latency video encoder 114 and the video decoder 134. FIG. 5 introduces the concept of 'block domain', 'raster domain' and 'compressed domain'. The latency overall is limited to less than one frame, such as thirty-two (32) raster lines maximum. The operation of the block partitioner 3100 in converting incoming raster scan samples 113 into blocks 3102 is further described. In particular, the incoming raster scan samples 113 are written in the 'raster domain' into a region of memory, e.g. the memory 206, sufficiently sized to hold one row of CTUs or blocks. This region of memory contains received samples 516 and future samples 518. Once the region of memory is full (i.e. every sample in the region has been received) the region of memory is switched from the raster domain to the block domain. The preceding region of memory has already been fully populated with samples and thus has already been converted to the block domain. Generally, sufficient memory for two regions is required, and they operate in a 'ping-pong' fashion; each alternating between raster and block domains to enable simultaneous uninterrupted receipt of raster scan video samples 113 and processing of blocks. The region of memory contains unprocessed blocks 514. The unprocessed blocks 514 have not been accessed for any processing by the video encoder 114.

As seen in FIG. 5, the first processing element is the Hadamard lookahead module 3101. The Hadamard lookahead module 3101 reads blocks sequentially to produce Hadamard costs. The lookahead window is of a fixed size. Thus, when the region becomes available for processing (i.e. is switched into the block domain), the Hadamard lookahead module 3101 firstly processes a batch of blocks to populate the lookahead window with Hadamard costs.

As shown in FIG. 5, a block 513 is being accessed for Hadamard cost derivation. Then, a block 512 is being accessed by the video encoder engine 3104 for encoding. Although the distance between the blocks 512 and 513 is shown as three blocks, practical lookahead window sizes are generally larger. A value of sixteen (16) is used in the video encoder 114, providing a trade-off between delay to being encoding the first block and providing adequate lookahead capability to anticipate changes in future block coding difficulty. Processed blocks 510, having been encoded already, are no longer accessed in the current region.

The video encoding engine 3104 outputs 'variable bit rate' (VBR) data in the form of a stream of syntax elements. Each block has a variable size in the compressed domain and the video encoder engine 3104 has a fixed latency to produce a compressed block, resulting in variable amounts of data being produced at fixed points in time. The video encoder engine 3104 is configured to process each block in fixed time (or a severely limited worst-case processing time), as the total time to process all blocks in a row of blocks is fixed. Then, the video encoding engine 3104 is not able to stall processing if the supply of VBR syntax elements is blocked. As the VBR syntax elements are supplied to a (CBR) communications channel 120, a means for decoupling is thus required. The output decoupler 3108 provides the means for decoupling.

The output decoupler 3108 provides a FIFO, enabling local bursts of VBR syntax element data to exceed the capacity of the CBR communications channel 120. The size of the FIFO sets a limit on the degree to which runs of VBR syntax elements can exceed this capacity.

As seen in FIG. 5, the CBR communications channel 120 supplies data at a constant bit-rate to the input decoupler 4100. The video decoder engine 4104 consumes variable-length syntax elements from the input decoupler 4100 at a variable bit rate. The video decoder engine 4104 produces decoded CTUs 4106 as output the CTU 538, for example, to the block departitioner module 4108.

The block departitioner module 4108 provides storage for already decoded blocks 536 and for future blocks that will be decoded 540 in the current row of blocks. Once all blocks in a CTU row have been decoded, the containing region is switched from the block domain to the raster domain. The region above is already in the raster domain, outputting decoded samples 534. Once output, storage in the region above 530 is unused. Once all samples in the region above are output, the region above is swapped from the raster domain back to the block domain. The overall system latency is not permitted to exceed 32 raster lines. Storage of samples in the block domain contributes 8 (eight) lines latency in each of the block partitioner 3100 and the block departitioner 4108, for a total of 16 lines latency.

Samples input/output in the raster domain contribute a further eight (8) lines total combined in the block partitioner 3100 and the block departitioner 4108 due to the timing synchronisation between the two modules 3108 and 4108. Total storage of sixteen (16) raster scan lines is provided in the raster domain, but the reading and writing processes are offset so that an eight (8) line difference is maintained between the supply of data to the block partitioner 3100 and the output of data from the block departitioner 4108. This gives a total of twenty-four (24) lines latency from handling of video data between the raster and block domains. Given the total permitted latency of thirty-two (32) lines, a maximum of 8 lines is available for processing latency in the video encoder engine 3104 and the video decoder engine 4100, and the associated decoupling (i.e. the output decoupler 3108 and the input decoupler 4100).

One consequence of an 8×8 CTU size is that no quadtree subdivision into multiple coding units (CUs) is performed. Instead, each CTU is always associated with one 8×8 CU. For an 8×8 CU, a residual quadtree is defined to always include one 8×8 transform unit (TU). The TU is configured to use one of multiple possible configurations. The possible configurations of the 8×8 TU are a result of the 'partition mode' and possibly a 'residual quad-tree split' of the CU.

For the primary colour channel (primary), the chroma format is not relevant and an 8×8 transform block (TB) 501 (residual quad-tree not split case) or four 4×4 TBs (residual quad-tree split case) are present when a PART_2N×2N partition mode is used. Four 4×4 TBs (referenced at 502 in FIG. 5A) are present when a PART_N×N partition mode is used.

When the video data is in the 4:2:2 chroma format, two pairs of 4×4 TBs are present (one pair of each secondary colour channel), regardless of the partition mode of the CU, or the presence of absence of a residual quad-tree split.

When the video data is in the 4:4:4 chroma format, the partition mode of the CU influences the arrangement of TBs, such that the same arrangements as for the primary colour channel is used. In particular, one 8×8 TB is used per secondary colour channel or four 4×4 TBs are used per secondary colour channel when the partition mode of the CU is PART_2N×2N and four 4×4 TBs per secondary colour channel are used when the partition mode of the CU is PART_N×N. For cases where multiple TBs are present for a given colour channel, the scan order of the TBs is defined as a 'Z-scan' order (i.e. iterating over the blocks firstly top left-to-right and then lower left to right). The colour channels are processed with primary colour channel first (i.e. luma), followed by the secondary colour channels (i.e. 'chroma'). This ordering corresponds to Y, Cb, then Cr, or G, B then R.

Video compression standards such as HEVC and AVC define a process for delineating packets of compressed data within a video bitstream. The process defined by HEVC and AVC involves prepending of a fixed code to the beginning of each packet of video data. Each packet is referred to as a 'network abstraction layer' (NAL) Unit. The prepended code is known as a 'NAL unit start code'. Then, it becomes necessary to prevent sequences of bits within a NAL unit that correspond to the NAL unit start code from falsely being detected as a new NAL unit. NAL unit start codes are the three byte sequence '0x000001', which is achieved using 'emulation prevention bytes'.

Emulation prevention bytes are a byte-stuffing process whereby such false NAL unit start codes are broken up by inserting a '0x03' byte code. The bitstream parsing process extracts these bytes prior to syntax element parsing. The issue with this approach is that the actual bit rate of the stream cannot be known at the rate control stage, as the true rate is dependent on the syntax element values, in addition to their codeword length. In the worst case, every third byte in a NAL unit may be an emulation prevention byte, resulting in a 50% bandwidth increase compared to the actual syntax element data contained in the NAL unit payload. For a real-time low latency video encoder, such uncontrollable variation would severely limit the timing of the system. For example, each CTU row could be encoded into ⅔ of the available bandwidth to allow for worst-case emulation prevention byte insertion. Such a trade-off would be highly inefficient and greatly reduce the achievable coding efficiency, and hence is not further considered.

As an alternative, each NAL unit may be allocated a fixed size in the system 100, as described further with reference to FIGS. 14A and 14B. In the example of FIGS. 14A and 14B, no start codes are necessary, nor are any emulation prevention bytes needed. Instead, the video encoder engine 3104 may be configured to deliver each NAL unit on time, as required to present the communications channel 120 with a continuous stream of NAL units that forms a valid bitstream. There is no means to stall the communications channel 120 if no data is available. Such a means to stall the communications channel 120 would introduce additional overhead. Moreover, the video decoder engine 4104 may be configured to supply decoded samples as output at the timing required of the output interface (HDMI, SDI, DisplayPort etc). As such, stalling is not possible in such a tightly coupled system. The NAL units of HEVC include a 'NAL unit type', a value instructing the decoder what type of payload to expect inside the NAL unit. In the system 100, the frame structure is fixed, and hence NAL unit types are not stored in the bitstream. Instead, the NAL unit type is inferred for each NAL unit, based upon the position of the NAL unit relative to the beginning of the frame. Inherent in this inferred NAL unit type design is knowledge of where the frame 'starts' within the stream of incoming data to the video decoder 134 over the communications channel 120. This knowledge is provided by out-of-band signalling, such as vertical sync.

Figure 6A:
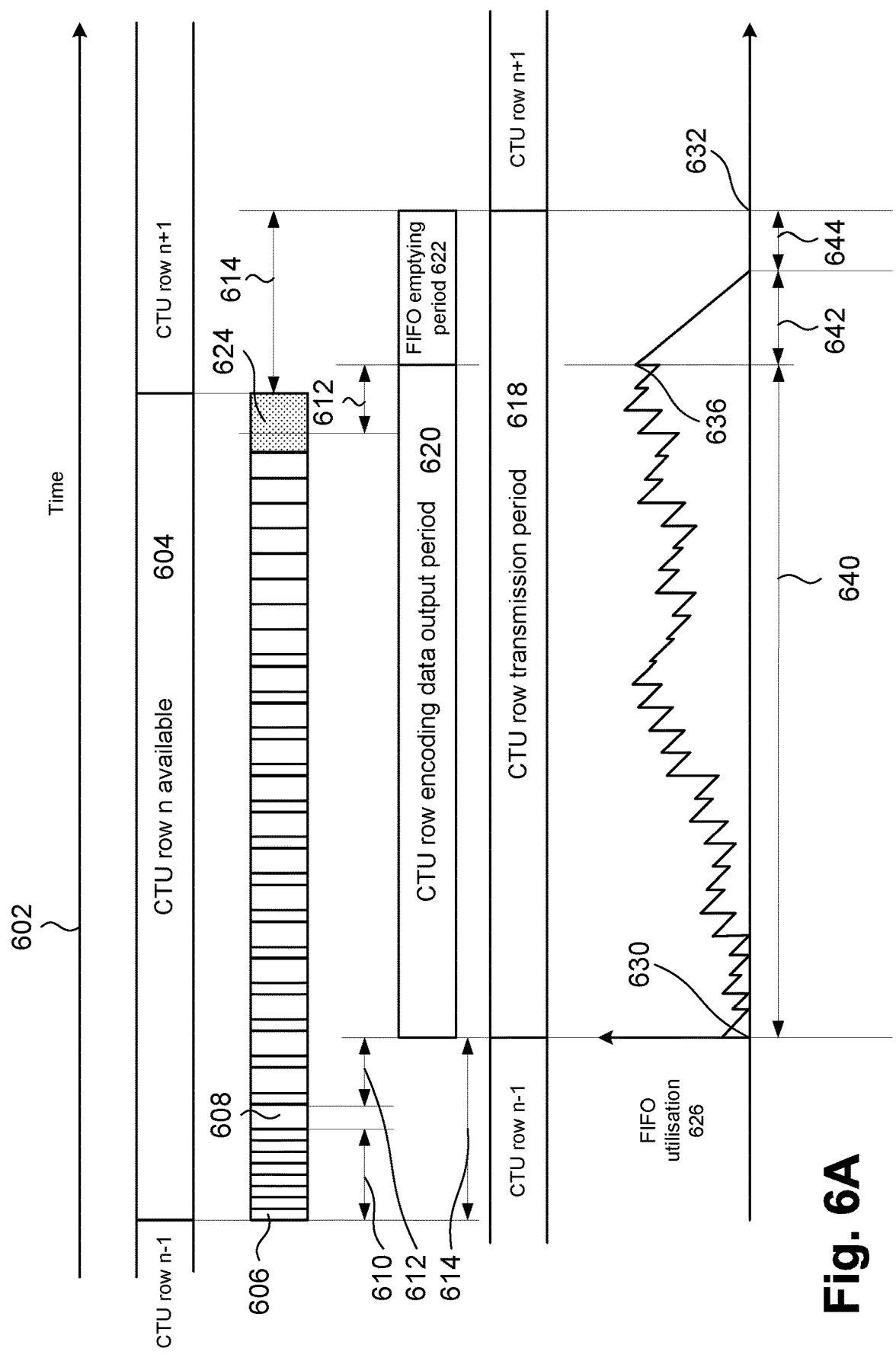
FIG. 6A is a schematic block diagram showing the timing of the video encoder of FIG. 3A.

FIG. 6A is a schematic block diagram showing the timing of the video encoder 114. A time axis 602 depicts the flow of time in the video encoder 114. A CTU row 604 of a frame is available in the block domain in the block partitioner 3100 for a given period of time. Initially, a series of block accesses, such as block access 606 are performed by the Hadamard lookahead module 3101 to populate the lookahead window. As such, no CTUs are encoded during this time period. Once the Hadamard lookahead window is populated, then block accesses are interleaved between the Hadamard lookahead module 3101 and the video encoder engine 3104. Block access 608 is an example block access for the video encoder module 3104. Eventually, all blocks in the CTU row have been processed by the Hadamard lookahead module 3101, and thus accesses for the Hadamard lookahead module 3101 cease. Further, in the arrangement of FIG. 6A, all blocks are eventually accessed by the video encoder engine 3104 and subsequently, accessed of the block partitioner 3100 by the video encoder engine 3104 also cease. Delay 610 represents total delay to populate the Hadamard lookahead window.

Block 608 also has an associated delay, as the samples in the CTU are accessed in multiple transactions to a memory, such as the memory 206, and the processing within the video encoder engine 3104 has a degree of internal serialisation. Then, the video encoder engine 3104 has a processing latency. Although the video encoder engine 3104 can process blocks at a bit rate corresponding to the block 608 period, internal processing pipelining results in an encoding latency 612. The sum of the delay 610, the block 608 latency and the encoding latency 612 results in a delay 614. The delay 614 is the time from the availability of a CTU row for processing and the output of corresponding compressed bitstream. The delay 614 results in a CTU row transmission period 618, equal in length to the CTU row 604 period, and offset by the delay 614. The output decoupler 3108 incorporates buffering, such as a FIFO, to supply data at a constant bit-rate to the communications channel 120. Then, after encoding the last CTU in the CTU row 604, the utilisation of the FIFO may be anywhere from empty to full. As such, a FIFO emptying period 622 is reserved, during which no further data is supplied to the FIFO. The FIFO is therefore able to empty its contents into the communications channel 120 so that all CTUs in the CTU row 604 are encoded in the CTU row encoding period 620 and transmitted in the CTU row transmission period 618.

As the period 620 includes the latency 612, all block read accesses by the video encoder engine 3104 of the block partitioner 3100 needs to complete prior to the end of the period of availability of the CTU row 604 resulting in a 'dead zone' 624, during the dead zone 624 it is not possible to process data while producing an encoded bitstream within the constraints of the CTU row transmission period 618. As such, all data accesses for encoding CTUs must take place prior to the dead zone 624 time interval.

FIFO utilisation 626 shows example FIFO utilisation during the CTU row transmission period 618 corresponding to the CTU row 604. At time instant 630, corresponding to the beginning of the CTU row transmission period 618, the FIFO commences the period 618 in an empty state. At time instant 632, corresponding to the end of the CTU row transmission period 618, the FIFO ends the period 618 also in an empty state. This permits back-to-back packing of compressed CTU rows into the communications channel 120. In multi-core implementations, back-to-back packing of compressed CTU rows into the communications channel 120 could be produced by different processing cores, operating in a staggered fashion, such that each compressed CTU row is available in time for transmission. However, these a multi-core approach would generally have longer latency due to the performance of individual cores being lower. In this instance, the aggregate real-time data rate is achieved via parallelism.

As each coded CTU is output from the video encoder engine 3104, the output decoupler 3108 utilisation increases by a variable amount, corresponding to the size in bits of the compressed CTU. The output decoupler 3108 utilisation then falls as data is output to the communications channel 120 at constant bit rate. In the case that the coded CTU data is insufficient to supply the communication channel 120 with data until the supply of coded data for the next CTU, padding is inserted, as described below with reference to FIG. 10.

As each CTU is coded, the utilisation of the output decoupler 3108 varies. Even with Hadamard costs as an estimate of coded block complexity, it is difficult to know the cost of a block until the block is coded. In particular, the local variation in runs of CTUs is very high. Even if the output decoupler 3108 is empty, a run of difficult-to-code blocks can quickly fill the output decoupler 3108. The rate controller 348 adapts the QP 384 to attempt to smoothly compensate for the local variation. The possibility of an output decoupler 3108 overflow would still be present. This possibility may be addressed via a residual truncation process, described further with reference to FIGS. 11 and 12.

After coding the last CTU in the CTU row, which happens at time instant 636, the output decoupler 3108 utilisation is somewhere between empty and full. Then, no further data is supplied to the output decoupler during the FIFO emptying period 622. The FIFO empties, for example, over the period 642. Once empty, a null period 644 exists, where the FIFO is not supplying the communications channel 120 with data. In a CBR system, the null period 644 contains a filler code (e.g. just 0x00 bytes). The filler code is necessary for the CBR system because it is not possible to 'bring forward' coded data for the next CTU row, as the corresponding uncompressed data is not yet available for coding by the video encoder engine 3104.

Figure 6B:
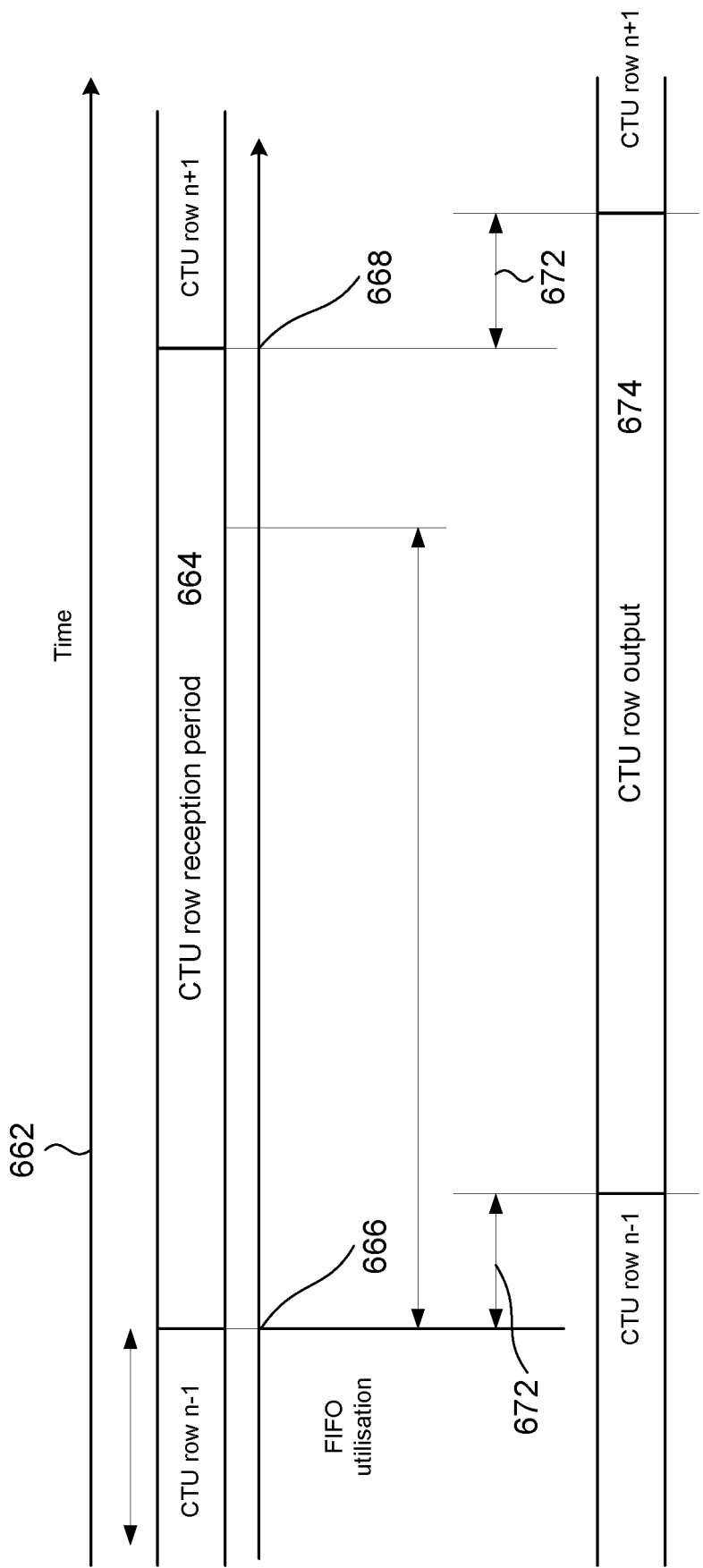
FIG. 6B is a schematic block diagram showing the timing of the video decoder of FIG. 4A.

FIG. 6B is a schematic block diagram showing the timing of the video decoder 134. A time axis 662 depicts the flow of time in the video decoder 134. A CTU row reception period 664 in the video decoder 134 corresponds to the CTU row transmission period 618 in the video encoder 114. The incoming stream of data from the communications channel 120 is a continuous stream. The data may be framed, the data may be carried, for example as video samples over an SDI or HDMI link. In such a case frame delineation via a vertical sync signal is available. Even so, for parallel processing it is necessary for each CTU row to be separated for processing by a different processing engine. Then, each CTU row needs to be self-contained as far as bitstream parsing is concerned. Thus, at time instant 666, the input decoupler 4100 FIFO is required to be empty. This can be achieved by resetting the FIFO based on the vertical sync signal, then subsequently resetting the FIFO at each slice segment end (aligned to the vertical sync signal). In such a case, periodic resets would be performed, corresponding to the boundary between each CTU row (or slice segment). A bitstream must not only obey the defined syntax (order of and dependencies between syntax elements) but must also be produced under timing constraints, and enable decoder operation with given timing characteristics. Bitstreams that meet these requirements are known as 'conforming bitstreams'. For a conforming bitstream being conveyed over the communications channel 120, this would not result in the loss of any data, other than some filler data, e.g. 644, which can be discarded safely.

Then, at time instant 668, the input decoupler 4100 FIFO needs to contain zero or more filler bytes. The time required to parse syntax elements of each CTU by the entropy decoder 420 varies, as the rate of consumption is constrained by the bandwidth of the communications channel 120. Subsequent processing stages in the video decoder engine 4104 operate in fixed time. Thus the overall latency for decoding each CTU is constant, even if the starting times for decoding each CTU are not constant due to waiting on data arrival. Then, each compressed CTU is decoded as the CTU is received. In the event that runs of highly compressed CTUs are received, the input decoupler 4100 FIFO may fill to some extent. The presence of padding bits when the output decoupler 3104 FIFO empties forms a limit on the worst case processing time for the video decoder engine 4104. In particular, should runs of highly compressed CTUs be received, it is possible that the video decoder engine 4104 consumption of syntax elements falls below the constant-per-CTU processing delay (as opposed to latency). Then, the input decoupler 4100 FIFO will fill temporarily, until larger compressed CTUs, with more data to consume, are supplied to the video decoder engine 4104. At such a time, the CTU rate of processing by the video decoder engine 4104 is maintained, allowing the input decoupler 4100 FIFO to empty. This is because syntax elements such as residual data are generally consumed at a constant rate per clock cycle, regardless of their size. If insufficient data for consumption is present, then the decoding process pauses until more data becomes available. As such runs of blocks with lower magnitude residual coefficients set a higher requirement on the processing rate of the video decoder than that runs of blocks with more residual data, as data is supplied at a constant rate to the input decouple 4100 FIFO. The video decoder engine 4104 operates with fixed latency 672. The fixed latency 672 results in output of decoded CTUs over the CTU row output period 674. During the CTU row output period 674, decoded blocks are stored in the block departitioner 4108. The video decoder engine 4104 operates with sufficient capacity to always consume all CTU data during the CTU row reception period, and to output all the decoded blocks during the CTU row output period 674. The timing of output of individual blocks varies to a limited extent, due to the varying size of each coded CTU, being provided to the video decoder 134 via the CBR communications channel 120.

Figure 7A:
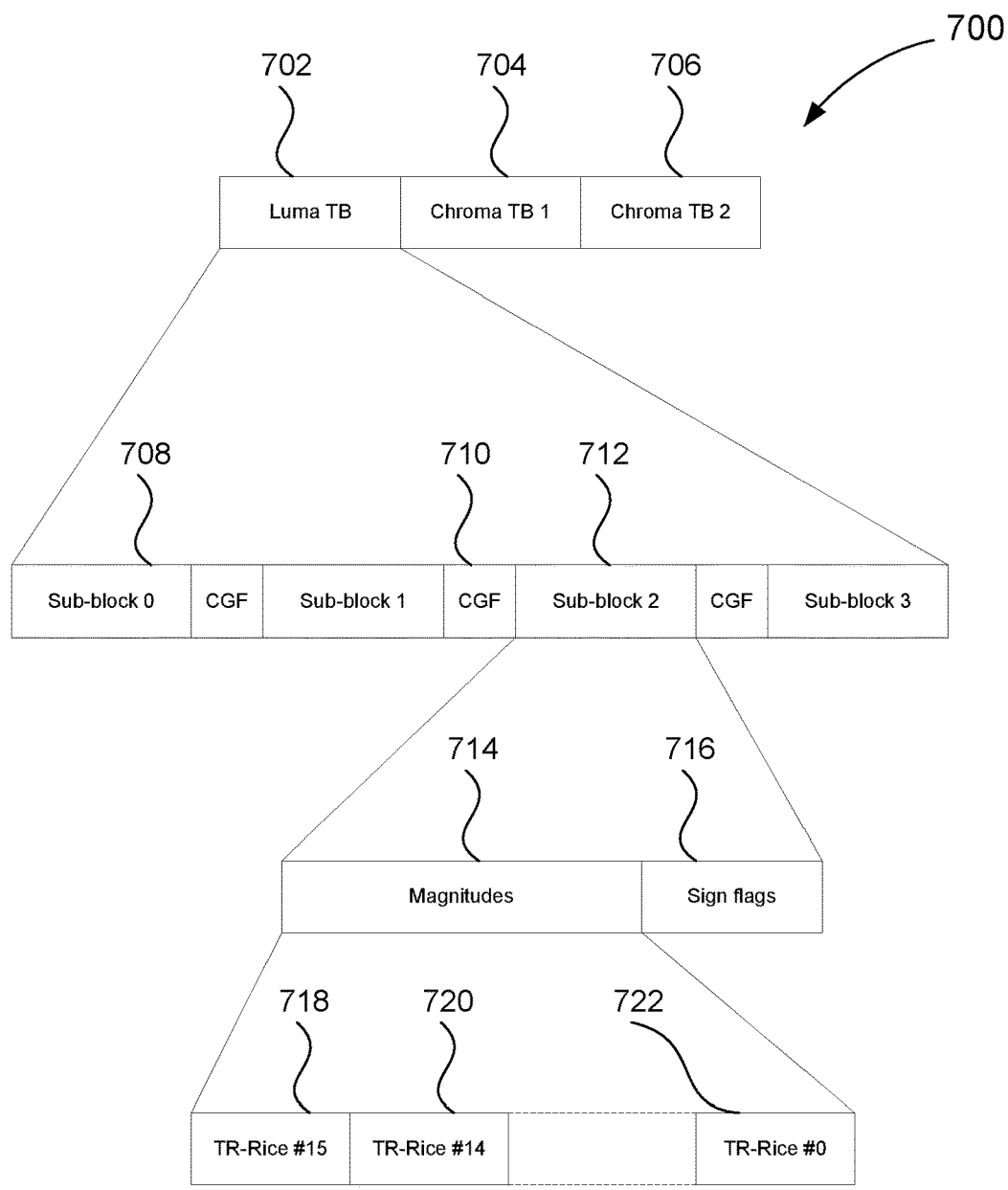
FIG. 7A is a schematic block diagram showing a bitstream syntax for coding the residual of an 8×8 transformed coding tree unit.

FIG. 7A is a schematic block diagram showing a bitstream syntax for coding the residual of an 8×8 transformed CTU 700. The CTU 700 includes three transform blocks, a luma TB 702, a first chroma TB 704 and a second chroma TB 706. As an example, the luma TB 702 is decomposed to show the residual coding. The luma TB 702 includes four sub-blocks (e.g. sub-block 0 708 and sub-block 2 712). Each sub-block includes sixteen (16) residual coefficients. The residual coefficients of sub-block 0 708 are always present in the bitstream. For sub-blocks 1-3, coefficient group flags are used to signal the coding of residual for each corresponding sub-block. When all residual coefficients in a given sub-block are zero, the corresponding coefficient group flag prohibits coding the sub-block, and the decoder infers that the residual coefficients of the sub-block are all zero. Otherwise, the coefficient group flag signals that the residual of the corresponding sub-block is coded. For example, coefficient group flag 710 signals that the residual for sub-block 712 is to be coded.

For a sub-block that is coded, the magnitudes (e.g. 714) are coded as a sequence of sixteen (16) residual coefficient magnitudes. The residual coefficient magnitudes are coded in reverse scan order from residual coefficient 15 718, residual coefficient 14 720 down to residual coefficient 0 722. The residual coefficient magnitudes are coded using the truncated unary Rice Golomb scheme as described with reference to FIG. 8. For any residual coefficient with a non-zero magnitude, a sign flag is coded, in the sign flags 716. Sub-block 0 corresponds to the top-left sub-block of an 8×8 TB, and contains the DC coefficient. As such, the sub-block 0 is highly likely to contain significant (nonzero) residual coefficients.

There is no flag to signal coding of the entire TB, ('coded block flag'). For visually lossless applications, there are very few instances of TBs with all-zero residual coefficients, and thus 'coded block flags' are not present. Instead, the residual syntax is capable of expressing an all-zero TB via the coefficient magnitudes. At higher compression ratios, the larger-valued residual coefficients tend to congregate at the upper-left region of a TB. Lower right regions tend to have zero-valued residual coefficients. This behaviour is exploited for coding efficiency gain by coding a 'last position', to reduce the scanning and coding to the run of residual coefficients (in the scan order) that contain nonzero residual coefficients. At lower compression ratios (higher bit rates) the property of congregation towards the upper-left region of a TB is less prominent. Also, as the residual energy displays less compaction towards the upper-left of the TB when the DCT is applied, no coding gain is achieved by coding a 'last position'. Then, instead of allowing scanning a subset of the residual coefficients in the TB coding, all positions in the TB are scanned.

Figure 7B:
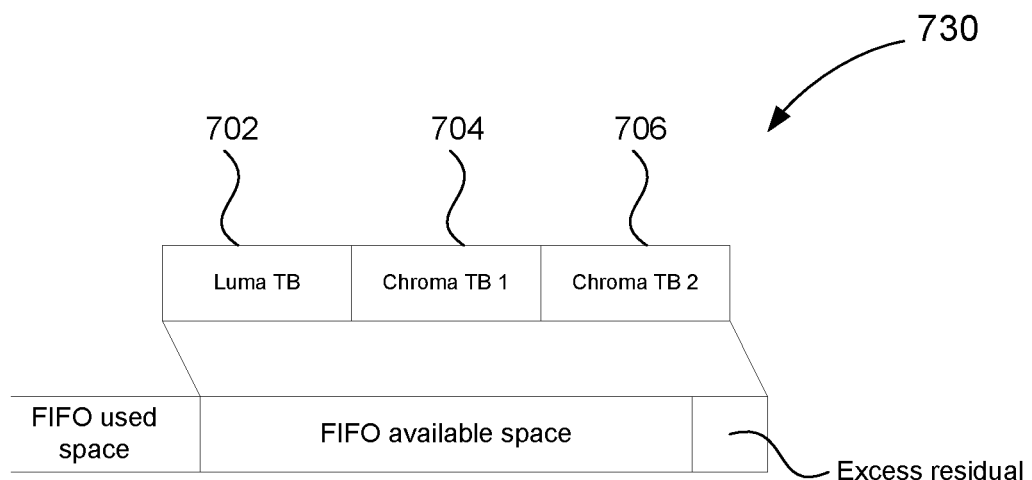
FIG. 7B is a schematic block diagram showing an ordering for truncating residual coefficients of the transform blocks of a CTU.

FIG. 7B is a schematic block diagram 730 showing an ordering for truncating residual coefficients of the transform blocks of a CTU. The residual is for a CTU partition to use 8×8 TBs. As such, three 8×8 TBs are present; one TB for luma and two TBs for chroma. As shown, the total length of the residual data exceeds the remaining space for the residual. Then, truncation of the residual is necessary. In the example of FIG. 7B, truncation occurs on a sub-block by sub-block basis. As such, there is no re-evaluation of residual costs within a sub-block due to changes in the inter-coefficient Rice parameter update process. Each 8×8 TB includes four sub-blocks, as further described with reference to FIG. 9. When truncating the residual, an ordering for truncating sub-blocks is shown in FIG. 7B. As seen in FIG. 7B, the first sub-block to truncate is the lower-right sub-block of the second chroma channel. Truncation proceeds in round-robin fashion between the first and second chroma channels, working backwards to the upper-left sub-block in the two chroma channels. Only once all chroma residual coefficients have been truncated does the truncation process potentially proceed to truncate residual sub-blocks in the luma transform 702. Such an approach has the advantage of firstly targeting the less perceptually significant chroma residual for truncation, followed by the luma residual if necessary. Truncation continues until the remaining coded residual coefficients are able to be stored in the FIFO.

Figure 8:
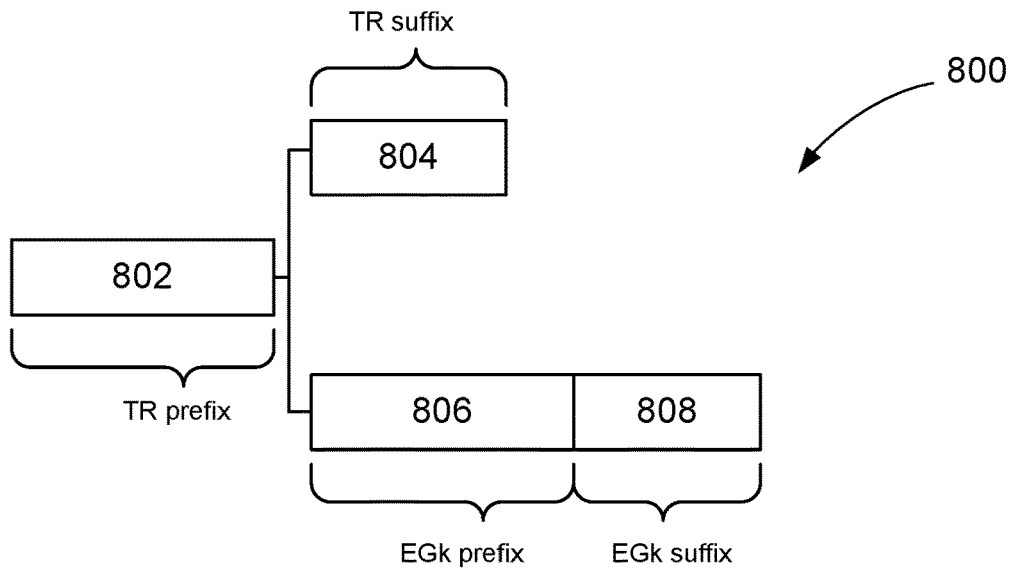
FIG. 8 is a schematic block diagram showing a coefficient magnitude syntax structure.

FIG. 8 is a schematic block diagram showing a syntax structure for coding a coefficient magnitude (i.e. a coef_abs_level syntax element) 800. The coef_abs_level syntax element includes a Truncated Rice (TR) prefix 802 and, optionally, either a TR suffix 804 or a k-th order exponential Golomb (EGk) prefix 806 and an EGk suffix 808. The TR prefix 802 is a unary codeword with a maximum length of four bits. If the codeword length is less than four, then the TR suffix 804 is also present. The TR suffix 804, if present, is a fixed-length codeword with a length equal to Rice parameter value in use for coding the coef_abs_level syntax element 800. The TR suffix 804 values are depicted in FIG. 8 as 'X' or 'XX' for Rice parameter values of one (1) and two (2) respectively. The TR suffix 804 values should be considered to expand to the space of all possible values (i.e. '0' and '1' for 'X' and '00', '01', '10' and '11' for 'XX'), for coding discrete residual coefficient values. If the TR prefix 802 has the value of '1111' then a kth-order exponential-Golomb (EGk) codeword is present.

Example binarisations for the EGk prefix 806 and the EGk suffix 808 are shown in FIG. 8. As can be seen in FIG. 8, coding the coef_abs_level syntax element 800 as shown in FIG. 8 results in a smooth transition in terms of codeword length between the truncated Rice portion and the EGk portion.

Figure 9:
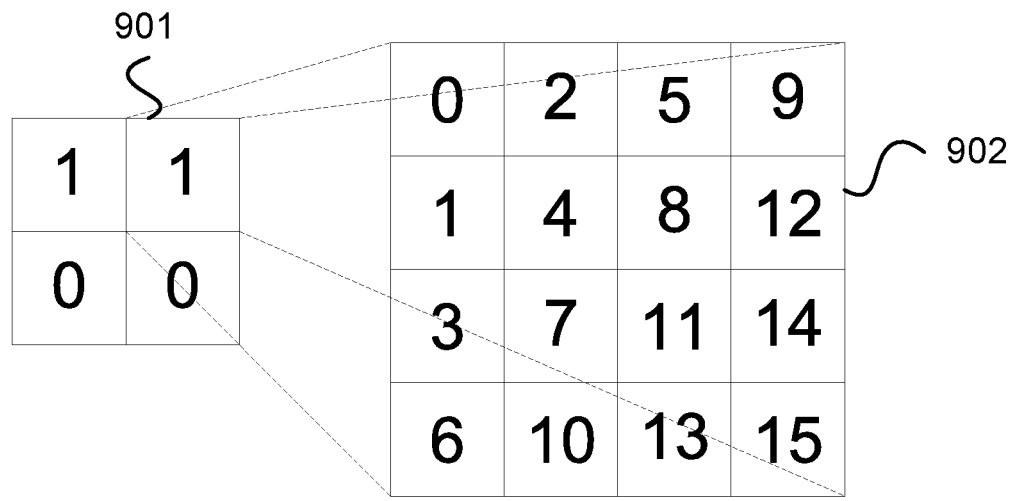
FIG. 9 is a schematic block diagram showing a scan order for an 8×8 transformed block.

FIG. 9 is a schematic block diagram showing residual coefficients for a sub-block 902. A set of four coef_group_flags 901 for an 8×8 TB indicate whether each corresponding set of sixteen residual coefficients for each sub-block, e.g. sub-block 902 are to be coded. In the example of FIG. 9, the upper-right flag of the coef_group_flags 901 has a value of one, and thus the upper-right set of 4×4 residual coefficients, corresponding to the sub-block 902 are scanned and coded in the bitstream. If all the residual coefficients in a given 4×4 sub-block are zero, then the corresponding coef_group_flag is set to zero. In such a case, the residual coefficients are not scanned and the decoder infers the values to all be zero. The residual coefficients are numbered according to the scan position (from zero (0) to fifteen (15)). A reverse-order scanning process is used, as shown in FIG. 7A, resulting in scanning from position fifteen (15) down to position zero (0). The reverse-order scanning process is beneficial as the Rice parameter, used to assist with magnitude coding, adapts as each coefficient is scanned, with maximum benefit when processing from high-frequency (lower magnitude; high scan position) to low-frequency (higher magnitude; low scan position) coefficients. Also, the starting Rice parameter, i.e. the Rice parameter value used for the first non-zero residual coefficient encountered when progressing from position 15 down to position 0 in a sub-block, is initialised based on the residual magnitudes encountered in previously scanned sub-blocks. Separate state information for Rice parameter initialisation for each sub-block is maintained for luma vs chroma TBs and transform vs transform-skipped TBs, resulting in four state variables being used for Rice parameter initialisation. When coding a sub-block, one of the four state variables is updated based on the residual coefficient magnitudes encountered in the sub-block. Then, when truncating the residual, it is necessary to re-evaluate the updated value for the considered state variable.

Figure 10:
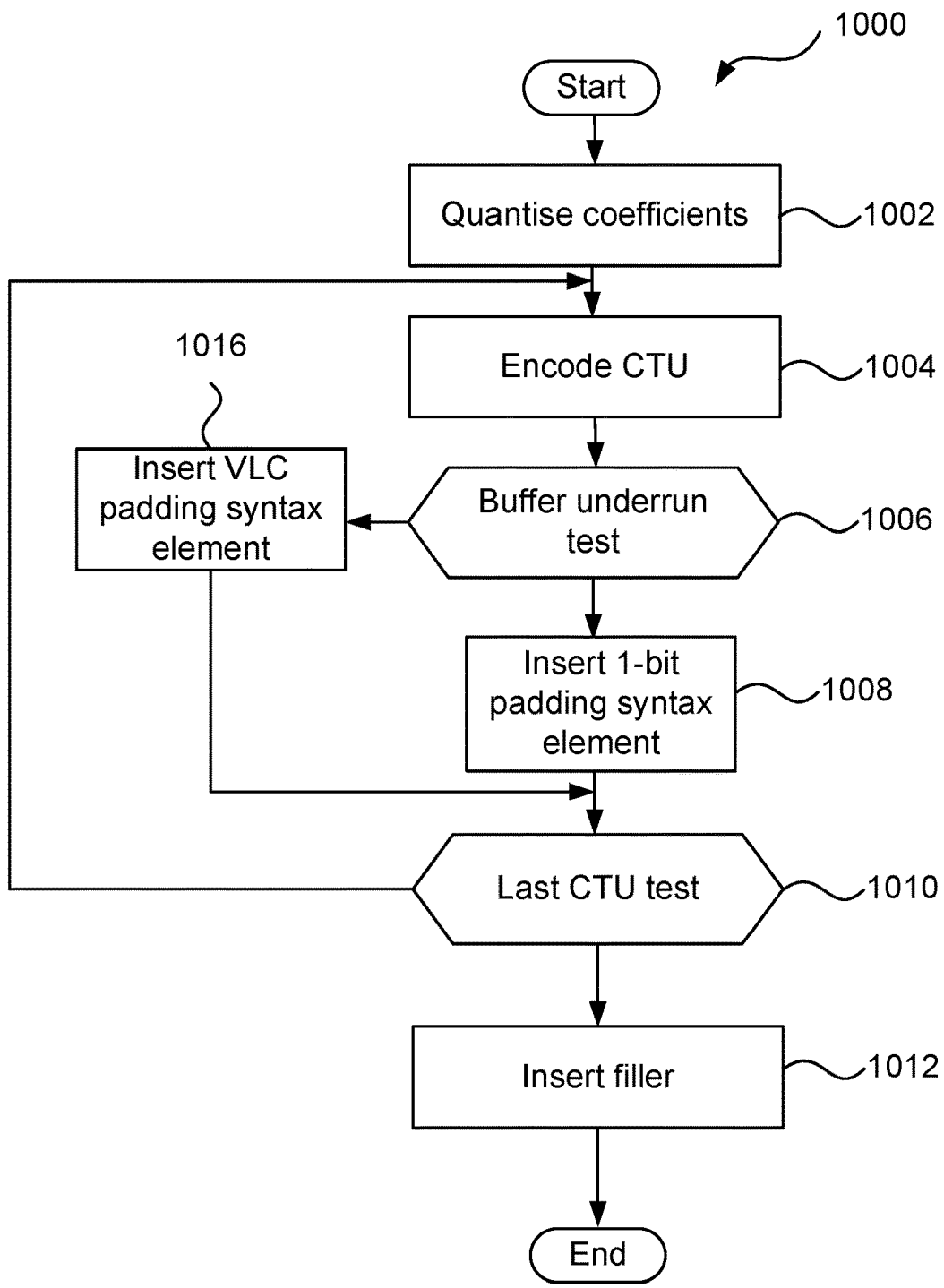
FIG. 10 is a schematic flow diagram showing a method of padding a bitstream with data to meet a minimum buffer utilisation requirement.

FIG. 10 is a schematic flow diagram showing a method 1000 of padding a bitstream with data to meet a minimum buffer utilisation requirement. The method 1000 may be implemented by the video encoder 114, as one or more software code modules of the application program 233 resident in the hard disk drive 210 and being controlled in its execution by the processor 205. The method 1000 results in the creation of the variable length syntax elements 3106 that includes 'padding' data, inserted when insufficient data is generated from the entropy coding process in the entropy encoder 324 to prevent an underflow in the output decoupler module 3108 FIFO. Underflows need to be avoided because otherwise there would be no valid data available for transmission over the communications channel 120.

The method 1000 starts at a quantise coefficients step 1002.

Figure 7B:
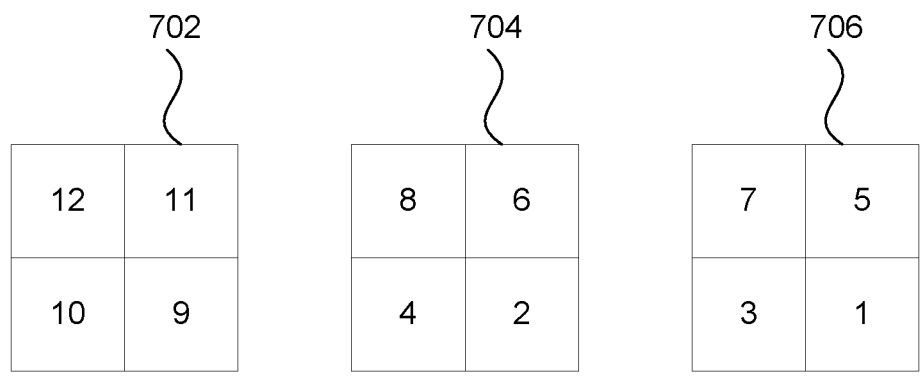

At the quantise coefficients step 1002, the quantiser module 322, under control of the processor 205, quantises coefficients from the transform module 320 according to the quantisation parameter 384. Step 1002 results in residual coefficients for a TB, to be coded into the variable length syntax elements 3106. The TB is coded as a sequence of sub-blocks, in accordance with the structure shown with reference to FIG. 7. Control in the processor 205 then passes to an encode CTU step 1004.

At the encode CTU step 1004, the entropy encoder 324, under control of the processor 205, encodes the residual coefficients of each sub-block of the considered TB as further variable length syntax elements 3106. For TBs sized larger than 4×4 a coefficient group flag ('coef_group_flag') is coded to indicate the presence of at least one significant residual coefficient in the sub-block.

The magnitude of each residual coefficient is coded using a coef_abs_level syntax element according to the binarisation scheme of FIG. 8, with a Rice parameter initialised according to a predictive scheme, based upon the coefficient magnitudes from previous sub-blocks, that accords with the HEVC specification. As a result of the encode CTU step 1004, a given quantity of bits is stored in the memory 206. Also stored in the memory 206 are 'coef_sign' flags, with one flag being stored per non-zero residual coefficient. The coef_abs_level and coef_sign flags are collectively referred to as 'coded residual coefficients'. Other syntax elements, such as prediction mode, CCP α parameter are also coded. Collectively, all syntax elements associated with a CTU form the compressed CTU. Control in the processor 205 then passes to a buffer underrun test step 1006.

At the buffer underrun test step 1006, the processor 205 tests the status of the compressed CTU to determine the utilisation, or amount of data presently required for storage in the memory 206. The size of the compressed CTU is compared with the amount of data in the output decoupler 3108 FIFO. The output of data from the output decoupler 3108 FIFO buffer occurs at a constant rate. Then, the video encoder engine 3104 needs to supply sufficient data to prevent a FIFO underflow from occurring. In the case that the compressed CTU is of insufficient size in bits to meet the requirement of avoiding a FIFO buffer underflow, a unary coded syntax element, coded once per CTU is used to avoid the FIFO buffer underflow. In such a case, control in the processor 205 passes to an insert VLC padding syntax element step 1016. Otherwise, control in the processor 205 passes to an insert 1-bit padding syntax element step 1008.

At the insert VLC padding syntax element step 1016, the entropy encoder 324, under control of the processor 205, inserts a variable length codeword syntax element into the output decoupler module 3108 FIFO buffer, after the compressed CTU data. The variable length codeword syntax element is coded as padding. The syntax element is coded after each CTU is coded, and the size of the syntax element needs to be sufficient to address any shortfall between between the compressed CTU size in bits and the number of bits required to avoid a FIFO buffer underflow before the next compressed CTU is delivered to the FIFO buffer. An $0^{th}$ order exponential-Golomb (EGO) or a unary-coded value may be used for the padding syntax element. Control in the processor 205 then passes to a last CTU test step 1010.

At the insert 1-bit padding syntax element step 1008, the entropy encoder 324, under control of the processor 205, inserts a 1-bit value for the padding syntax element (e.g. signalling the shortest possible unary codeword, or EGO codeword). Control in the processor 205 then passes to the last CTU test step 1010.

At the last CTU test step 1010, the processor 205 is used to test if the just-processed CTU is the last CTU in the CTU row. If the just-processed CTU is not the last CTU in the CTU row, control in the processor 205 advances to the next CTU in the CTU row, and control passes to the encode sub-block step 1004. Otherwise, control in the method 1000 passes to an insert filler step 1012.

At the insert filler step 1012, the output decoupler module 3108 FIFO buffer, under control of the processor 205, outputs 'filler codes' to the communications channel 120. For example, during the time period 644, filler codes (e.g. 0x00 bytes) are supplied until compressed CTU data for the next CTU row becomes available. The method 1000 then terminates.

As the padding syntax element represents unused capacity in the communications channel 120, the quantity of bits consumed by the syntax element may be minimised. A method 1100 of padding a bitstream by adjusting a Rice parameter for coded residual data to meet a minimum buffer utilisation requirement, will now be described with reference to FIG. 11. The method 1000 may be implemented by the video encoder 114, as one or more software code modules of the application program 233 resident in the hard disk drive 110 and being controlled in its execution by the processor 205.

The video decoder 134 receives and parses the bitstream 312, produced in accordance with the method 1000, and decodes residual data. The residual data is decoded by decoding, for each sub-block, coef_group_flags (if present), and coef_abs_level and coef_sign syntax elements. After the syntax elements associated with a given sub-block are decoded, the padding syntax element is parsed, and the resulting value is discarded.

With reference to FIG. 11, the method 1100, performed in the video encoder 114, eliminates overflows in the output decoupler module 3108 by truncating residual coefficients of one or more TBs and will now be described. The method 1100 begins at a quantise coefficients step 1102.

At the quantise coefficients step 1102, the quantiser 322, under control of the processor 205, quantises coefficients from the transform module 320 according to the quantisation parameter 384, as determined by the rate control module 348. Step 1102 results in residual coefficients for a TB, to be supplied to the output decoupler module 3108 FIFO buffer. The TB is coded as a sequence of sub-blocks, e.g. as described with reference to FIGS. 7 and 9. Control in the processor 205 then passes to a determine CTU cost step 1104.

At the determine CTU cost step 1104, the video encoder engine 3104, under execution of the processor 205, determines a CTU cost by summing the coded costs of all syntax elements resulting from the candidate configuration selected in the video encoder engine 3104. The determined cost includes costs resulting from magnitudes of the residual coefficients of all TBs in the CTU. For each sub-block in each TB, an initial Rice parameter is used to produce cost $cost_{initial}$ for coding the residual of the considered sub-block. The cost is the sum of the number of required flags (e.g. coef_group_flag) and the coef_sign bits and the lengths of the coef_abs_level syntax elements for the residual coefficients. Control in the processor 205 then passes to a buffer overrun test step 1110.

At the buffer overrun test step 1110, the expected buffer utilisation within the output decoupler 3108 is tested after adding the residual coefficients, coded using the required Rice parameter (e.g. from step 1104). The unused capacity is the output decoupler 3108 FIFO buffer provides a 'maximum bit rate budget' for the CTU being compressed. A buffer overrun occurs if the length of the coded residual coefficient data is too large to store inside the output decoupler 3108 FIFO. In such a case, it is not possible to store the entirety of the coded residual data in the output decoupler 3108 FIFO. Moreover, it is not possible to wait until more data is output over the communications channel 120, as the video encoder engine 3104 needs to progress to the next CTU in order to meet the real-time characteristic of the video processing system 100. Generally, a FIFO buffer overrun may potentially occur when a succession of CTUs with large compressed sizes, due to large untruncated magnitude residual coefficients, are encountered. The truncation method avoids such situations.

If the storage of the coded and unmodified residual data into the coded data buffer 330 would result in an overflow at the step 1110, control in the processor 205 passes to a truncate residual step 1112. Otherwise, control in the processor 205 passes to an encode sub-block step 1114.

At the truncate residual step 1112, the residual data is truncated, under execution of the processor 205, by setting residual coefficients to zero, in order to reduce the cost of coding the residual. The residual data may be truncated by setting coefficient magnitude values to zero, starting from the highest-numbered coefficient in the TB (corresponding to the highest frequency residual coefficient), and progressing backwards in the scan order to the upper-left residual coefficient. Once the residual coding cost is reduced to a size where the residual data can be stored in the coded data buffer (i.e. the residual size is less than or equal to the maximum bit rate budget), control in the processor 205 passes to the encode sub-block step 1114. The tendency to remove higher frequency coefficients results in some visual distortions. However, the selection of coefficients to remove is intended to minimise the visual impact, at least for the case where the DCT is employed. The visual distortions are a trade-off against the much more severe impact of failing to meet buffer size requirements, which results in an overflow and later slippage of the transmission rate of the data. As the video processing system 100 has closely linked timing between the video encoder 114 and the video decoder 134, such slippage would result in a loss of synchronisation of the output decoded video data. The loss of synchronisation of the output decoded video data impacts the ability of a display to properly present the decoded video data.

The DCT can be skipped ('transform skip' mode), in which case the visual significance of coefficients does not tend to diminish with increasing frequency. Hence, residual coefficients located at scan positions that would be used for high frequency coefficients in the case of transformed blocks remain equally important perceptually as residual coefficients located at scan positions that would be used for low frequenceies in the case of transformed blocks.

For transform-skipped blocks, the method of reducing excessive residual is performed uniformly across the sub-block, for example, by decimating alternating input values in either a horizontal direction or a vertical direction prior to a delta-PCM stage and in accordance with the direction. The resulting input values are then requantised to produce a new set of residual coefficients. In such a case, the decimation step results in a sparser residual (i.e. alternating rows or columns of non-significant residual coefficients).

At the re-encode residual step 1114, the entropy encoder 324, under control of the processor 205, re-encodes the residual coefficients (i.e. encodes the truncated residual coefficients) of the truncated TB. For TBs sized larger than 4×4, a coefficient group flag ('coef_group_flag') is coded to indicate the presence of at least one significant residual coefficient in sub-blocks other than sub-block zero (0).

Coef_abs_level is coded according to the binarisation scheme of FIG. 8. As a result of the re-encode residual step 1114, a given quantity of bits is stored in the memory 206. Control in the processor 205 then passes to a last CTU test step 1116.

At the last CTU test step 1116, the processor 205 tests if the just-processed CTU is the last CTU in the CTU row. If the just-processed CTU is not the last CTU in the CTU row, control in the processor 205 advances to the CTU in the CTU row, and control in the processor 205 passes to the determine CTU cost step step 1104. Otherwise, control in the processor 205 passes to an adjust QP step 1118.

At the adjust QP step 1118, the QP may be adjusted for use in the TBs of subsequent CTUs. Lowering the QP reduces the divisor applied to coefficients from the transform module 320, resulting in higher quality due to less discarded remainder at the expense of higher bit rate. Lowering the QP used for subsequent TBs results in larger magnitude residual coefficients, taking more bits to code. Also, some residual coefficients that previously had been quantised to zero (not significant) may quantise to a non-zero value. Adjustment of the QP is described further with reference to FIG. 13. The method 1100 then terminates.

If the truncate residual step 1112 is performed, the data rate is evidently excessive for the ceiling imposed by CBR operation, in which case, the QP used for subsequent TBs is raised. Raising the QP for subsequent TBs reduces the magnitudes of future residual coefficients, lowering the coding cost. Note that the rate of change of QP should be limited (e.g. to an increment or decrement of one per TB), to avoid excessive reaction to spatially localised variations in block complexity. The adjusted QP is signalled using a delta QP syntax element, signalled at the next TB. Then, the method 1100 terminates.

The video decoder 134 decodes an encoded bitstream 312, produced by the video encoder 114 according to the method 1100 using the signalled Rice parameter. As such, a Rice parameter is predicted for the sub-block and a delta is applied in accordance with the signalled delta sign and delta magnitude.

In an alternate arrangement of the method 1100, the truncate residual step 1112 is modified such that each sub-block is truncated entirely (i.e. all residual coefficients of the sub-block are set to zero), by setting the corresponding coefficient group flag to indicate that all residual coefficients in the sub-block have a zero value. Truncating each sub-block as a whole eliminates the need to determine revised Rice parameters for each residual coefficient that would otherwise result from the inter-coefficient Rice parameter update that occurs when coding coefficients within each sub-block. Such arrangements result in lower complexity, at a cost of potentially truncating more coefficients than are strictly required, due to the sub-block granularity of the truncation operation.

Generally, the need for truncation arises when processing a run of complex CTUs. In such cases, the QP adaptation of the rate control module 348 has been insufficient to avoid overflow. Then, truncation becomes necessary to avoid overflow and hence maintain the conformance of the bitstream to the timing requirements mandated within the system 100. As such, truncation at the sub-block level, although resulting in more distortion in the current CTU, represents a greater degree of recovery from the overflow situation. In particular, subsequent CTUs can be more costly without triggering further truncation operations. This can result in improved subjective quality, as the truncation in one CTU may not be as noticeable as truncation in a long run of CTUs.

In another arrangement of the method 1100, the truncate residual step 1112 is modified such that more than one residual coefficient is truncated on each truncation pass. For example, four residual coefficients may all be truncated together. Then, four truncation passes corresponds to truncating a sub-block, as per the previous arrangements. Arrangements of truncating more than one residual coefficient within a considered sub-block offers reduced distortion due to the retention of a greater degree of residual data, at a complexity increase due to the need to test a greater quantity of candidates for the final truncated residual.

Figure 12A:
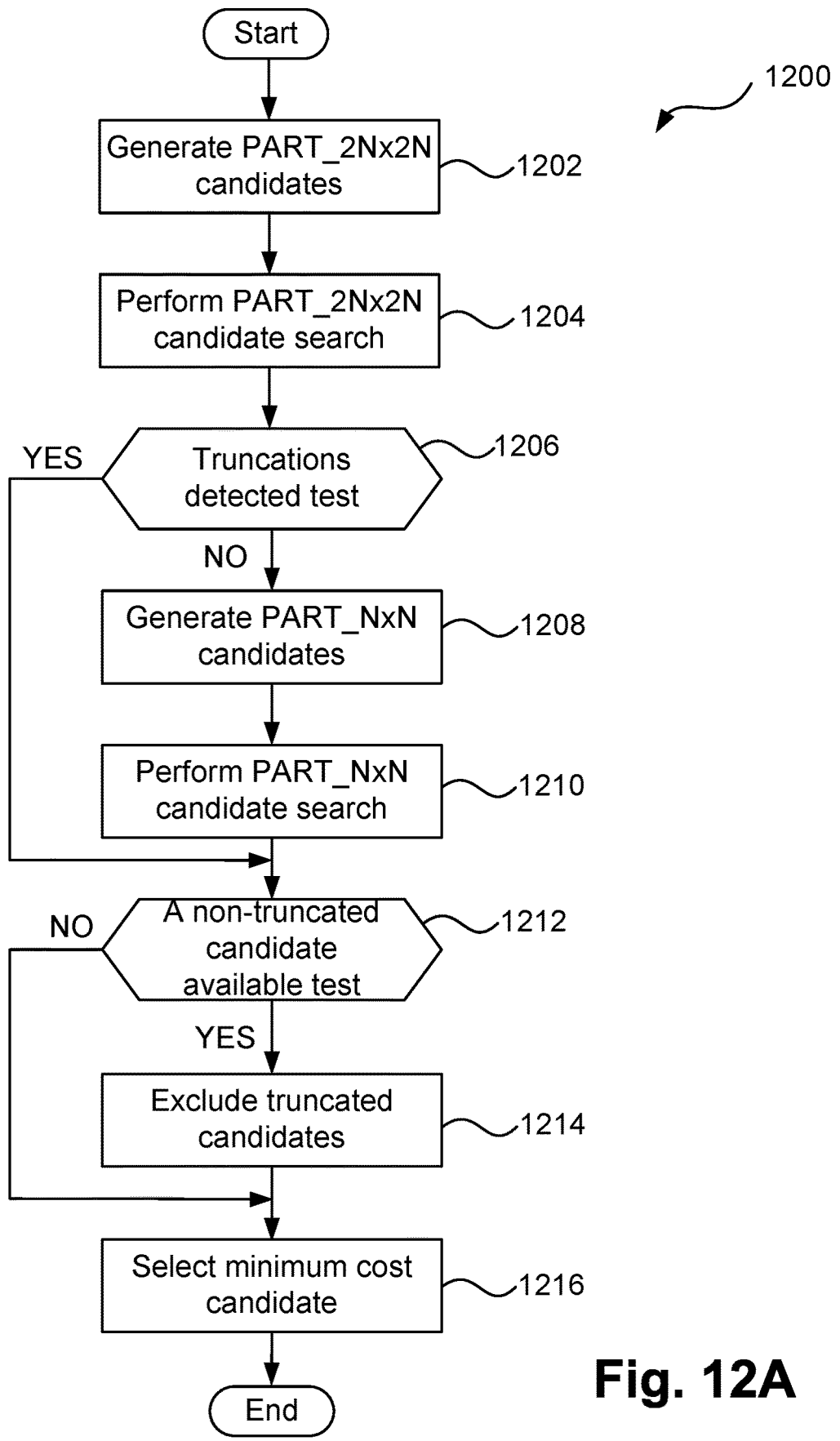
FIG. 12A is a schematic flow diagram showing a method of determining candidate modes to encode a coding tree unit.

FIG. 12A is a schematic flow diagram showing a method 1200 of determining candidate modes to encode a coding tree unit. The method 1200 may be implemented by the video encoder 114, as one or more software code modules of the application program 233 resident in the hard disk drive 210 and being controlled in its execution by the processor 205.

The method 1200 takes into account a restriction on the maximum permitted size of the coded coding tree unit. The system 100 supports two CU partitioning modes, namely the 'PART_2N×2N' mode and the 'PART_N×N' mode. With a configuration of 8×8 CTUs, there is one CU per CTU. For each of the partitioning modes, the system 100 supports a set of coding tools and intra prediction modes (including directional intra prediction, DC intra prediction and planar intra prediction). Examples of coding tools are 'transform skip' where the spatial/frequency domain transform is not applied, ACT—an adaptive colour transform between the RGB and YCoCg colour spaces, and CCP (cross-component prediction)—prediction of chroma residual from luma residual. To achieve a high compression efficiency the encoder evaluates (or 'searches') combinations of partitioning modes, intra modes and coding tools to produce a set of 'candidate modes' or 'candidate configurations'. This leads to an increased algorithmic complexity.

The complexity increase is in the video encoder 114, as the video encoder 114 makes the mode decision, i.e. selects (or 'searches' for) a candidate of the evaluated candidate configurations or combinations of modes, and signals the selected candidate configuration in the bitstream. Thus, complexity between the encoder and decoder is asymmetrical, as the decoder simply performs the final mode as signalled in the bitstream. Residual truncation by necessity increases distortion as residual information is discarded to maintain conformance to buffer capacity constraints. Thus, it becomes possible for the residual truncation to interact with the encoder candidate search, to reduce the frequency of instances where residual truncation is necessary. Such an approach is described in detail as the method 1200.

The method 1200 commences at a generate PART_2N×2N candidates step 1202.

At the generate PART_2N×2N candidates step 1202, the video encoder engine 3104, under control of the processor 205, generates a number of candidate configurations for the CTU. Each candidate configuration involves use of the PART_2N×2N partition mode. As such, 8×8 PBs are present, with one mode applied per candidate tested. Residual may be coded either using 8×8 TBs or four 4×4 TBs. Additionally, ACT may be used prior to processing the CTU. Also, cross-component prediction may be used to optionally predict the chroma residual for each TB from the corresponding luma TB. Multiple intra-prediction modes may also be evaluated. All evaluated combinations of these intra prediction modes, CCP and ACT usages form the set of candidate PART_2N×2N configurations. Each candidate configuration has at least three key properties, namely: bit rate, distortion and cost. These properties of candidate configurations are related by Equation (1), as follows:

$$C = R + \lambda D$$

where R is a determined the 'rate' (number of bits) required to code a given candidate configuration and D is the distortion resulting from the given candidate configuration. Distortion can be measured using different methods. For example, distortion can be measured as the 'sum of absolute differences' (SAD) over the block or the 'sum of square differences' (SSD) over the block. Lambda ($\lambda$) in Equation (1) represents a Lagrangian multipler, or scaling factor, used to combine R and D to produce an overall cost C. The video encoder 114 generally selects the candidate configuration with the lowest overall cost C.

In Equation (1), low values for $\lambda$ result in a greater sensitivity to R, at the expense of tolerating greater distortion to achieve higher compression ratios. Conversely, larger values of $\lambda$ result in distortion dominating the decision of which candidate configuration to use. Distortion may be reduced, at the cost of choosing more costly candidate configurations.

Control in the processor 205 then passes from the step 1202 to a perform PART_2N×2N candidate search step 1204.

At the perform PART_2N×2N candidate search step 1204, the video encoder engine 3104, under control of the processor 205, selects the optimal candidate from the candidates of the steps 1202, as the candidate resulting in minimised cost C. If the rate of this candidate exceeds the permitted or 'maximum' bit rate (i.e., the remaining capacity in the output decoupler 3108 FIFO buffer is exceeded), then residual truncation is applied and the candidate is marked as a 'truncated candidate'. Control in the processor 205 then passes to a truncation detected step 1206.

At the truncation detected step 1206, the video encoder engine 3104, under control of the processor 205, detects if\candidate from the step 1204 was marked as a truncated candidate. If candidate from the step 1204 was marked as a truncated candidate, searching for PART_N×N candidates is prohibited and control in the processor 205 passes to a non-truncated candidate available test step 1212. Otherwise, potential PART_N×N candidates may exist that also do not require truncation and thus control in the processor 205 passes to a generate PART_N×N candidates step 1208.

At the generate PART_N×N candidates step 1208, the video encoder engine 3104, under control of the processor 205, generates a number of 'candidate' configurations for the CTU. Each candidate configuration involves use of the PART_N×N partition mode. As such, four 4×4 PBs are present, with a degree of independence in the available modes for each PB. For example, the intra prediction mode of each 4×4 PB may be independently set. As a result, the number of different potential candidates in the step 1208 is greater than the number of potential candidates tested in the step 1202. The luma residual is coded using four 4×4 TBs (i.e. one per PB). The chroma residual is coded using additional 4×4 TBs. The cost of coding the PART_N×N candidates is derived from the syntax elements for coding the candidate configuration, including the syntax elements for coding the residual for luma and chroma TBs. Control in the processor 205 then passes to a perform PART_N×N candidate search step 1210.

At the perform PART_N×N candidate search step 1210, the video encoder engine 3104, under control of the processor 205, selects one candidate from the candidates generated at the step 1208, as the candidate resulting in minimised cost C. If the rate of a candidate exceeds the permitted rate, then the candidate is excluded from evaluation. Control in the processor 205 then passes to the non-truncated candidate available test step 1212.

At the non-truncated candidate available test step 1212, the video encoding engine 3104, under control of the processor 205, tests the available candidates to determine if at least one non-truncated candidate is available, from both the set of PART_N×N candidates and PART_2N×2N candidates. If at least one candidate that did not require truncation is available, control in the processor 205 passes to an exclude truncated candidates step 1214. Otherwise, control in the processor 205 passes to a select minimum cost candidate step 1216.

At the exclude truncated candidates step 1214, the video encoder engine 3104, under control of the processor 205, excludes all candidate configurations that have had residual truncation performed on the candidate configuration (e.g. that have been marked as truncated) (or that would require residual truncation to be performed). The non-truncated versions of the candidate configurations may produce lower distortion, however they cannot be stored in the output decoupler 3108 FIFO without causing a delay in the video encoder engine 3104, which needs to be avoided. Thus, such candidates are excluded from further consideration. Control in the processor 205 then passes to the select minimum cost candidate step 1216.

At the select minimum cost candidate step 1216, the video encoder engine 3104, under control of the processor 205, selects the minimum cost candidate from the remaining set of candidates. As such, the selected candidate does not to result in overflow in the output decoupler 3108 FIFO. Moreover, the search operation of the method 1200 results in a non-truncated PART_2N×2N candidate being given priority for selection over a truncated PART_N×N candidate, even though the non-truncated version of the considered PART_N×N candidate(s) may provide reduced distortion. This prioritisation provides the benefit of fewer instances of truncation. Fewer instances of truncation results in lower distortion, even if sometimes a more distorted (non-truncated) candidate is selected, because truncation may introduce significant distortion. The method 1200 then terminates.

In one arrangement of the method 1200, the residual truncation is performed 'in loop', i.e. the truncation process, if needed, is applied to the residual from the quantiser module 322 and supplied to the dequantiser module 326. Such arrangements have the advantage that the intra prediction reconstruction loop contains the same sample value as present in the video decoder 134. As a consequence, even blocks with truncated residuals form a correct basis for intra prediction on future CTUs. However, the length of the feedback loop is lengthened, as the truncation operation must be performed to produce correct reference samples for referencing by subsequent PBs, requiring more complex design in the video encoder 114.

In another arrangement of the method 1200, the residual truncation is applied to the residual coefficients 364 only for the entropy encoder 324. This is referred to as 'out of loop' residual truncation. Out of loop residual truncation keeps the feedback loop for intra prediction at the same degree of complexity as compared to HEVC. The residual truncation process can also be pipelined, facilitating high speed design. One drawback of out-of-loop residual truncation is that when truncation occurs, the intra reconstruction process in the video encoder 114 will no longer match the corresponding process in the video decoder 134. As residual truncation is a rare occurrence to deal with highly problematic content (mainly seen at compression ratios exceeding 6:1), the reduction in complexity may be considered as justified.

In yet another arrangement of the method 1200, the restriction on the 'search space' (exclusion of searching PART_N×N candidates based on the result of evaluation rates of the searched PART_2N×2N candidates) allows a run-time reduction, e.g. in the processor 205. In arrangements of the method 1200 where parallel hardware is used to perform the search, although the hardware area needs to afford the worst case of searching all possible candidates, a power consumption reduction is possible by reducing the search where possible. That issearching may be prohibited for PART_N×N candidates if no non-truncated PART_2N×2N candidate mode is available.

Figure 12B:
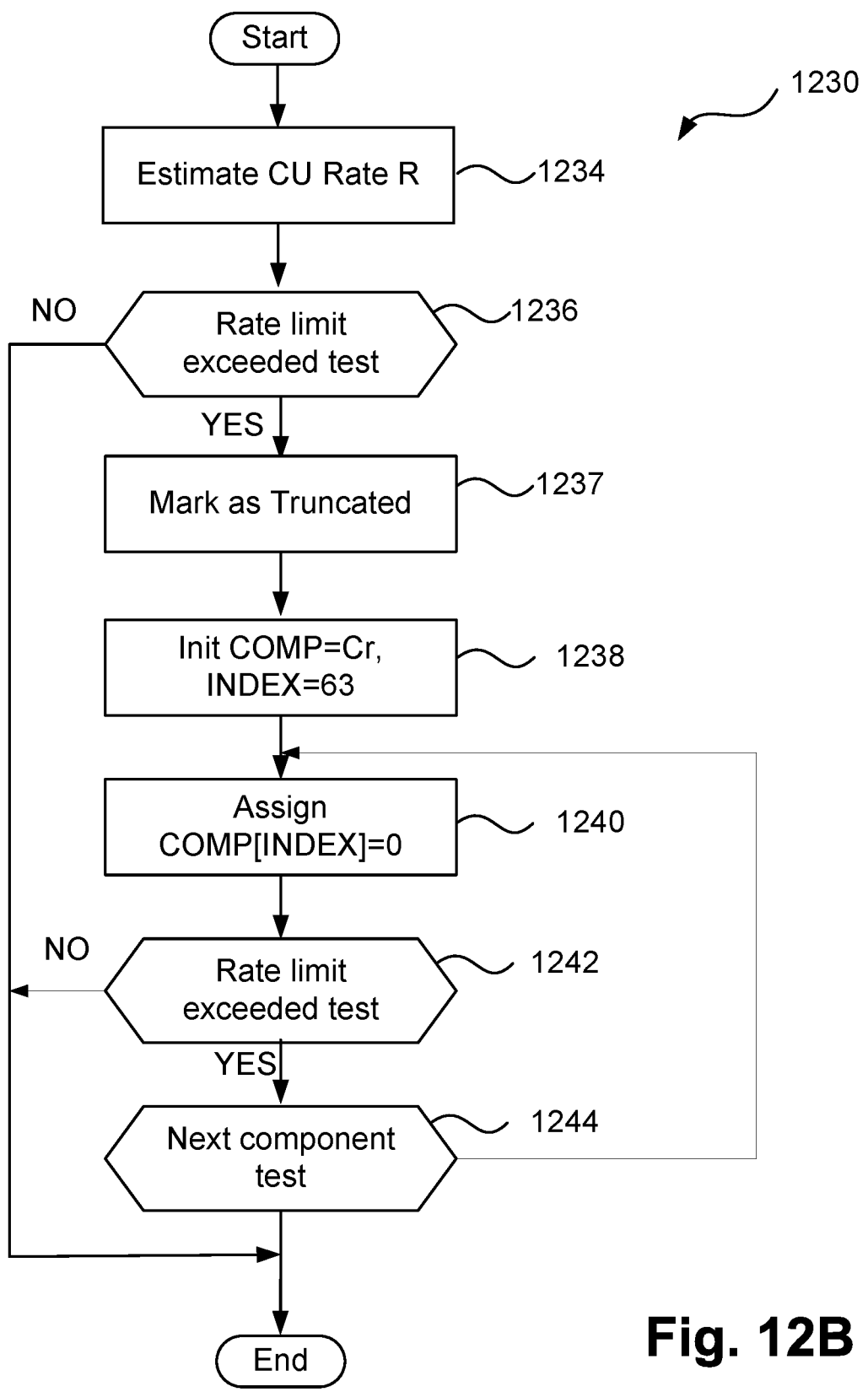
FIG. 12B is a schematic flow diagram showing a method for residual truncation.

FIG. 12B is a schematic flow diagram showing a method 1230 for residual truncation. In an arrangement of the method 1200, the residual truncation at the step 1204 is performed according to a method 1230. The method 1230 performs truncation on an 8×8 TU, with three 8×8 TBs (one per colour component for the 4:4:4 chroma format). Truncation is performed on a coefficient-by-coefficient basis, resulting in minimising the degree of truncation performed to meet the required rate for the CTU or TU.

At step 1234 the video encoder 114, under control of the processor 205, estimates bit rate of the current CU or CTU. Estimating bit rate of a block of video data is a process of summing the rate (codeword length in bits) of all coded syntax elements for the block. For variable-length codewords, this requires knowledge of the syntax element value.

At a step 1236 the video encoder 114, under control of the processor 205, checks whether the estimated bit rate is below the output decoupler 3108 FIFO overflow limit. If the rate is below the limit, then the control leaves the method 1230 and the current combination of partitioning mode, intra mode and selected coding tools is not marked as truncated. Otherwise, the control is passed to a step 1237.

At the step 1237 the current combination of partitioning mode, intra mode and selected coding tools is marked as truncated. This marking process indicates that the residual to be coded for the considered combination of coding tools is not optimal in the sense that the residual coefficients were not derived solely from the quantisation process. As such, the truncation process has been applied and the residual coefficients further altered, resulting in an increase in distortion when the reconstruction process is performed.

At a step 1238 a local variable COMP, representing a current component is initialized to value 'Cr' and a local variable INDEX representing a current coefficient index is initialized to the last index value for an 8×8 TB, i.e. sixty-three (63). For a 4×4 TB, the last index value would be fifteen (15).

At a step 1240 a coefficient of the current component at the current index is zeroed, i.e. the quantised value is discarded and replaced with a '0' value. As seen in FIG. 8, coding such a value results in the shortest possible codeword length for the coefficient (noting that the codeword length is also affected by the applied Rice parameter).

At a step 1242, the video encoder 114, under control of the processor 205, estimates the bit rate and checks whether the estimated bit rate is below the output decoupler 3108 FIFO overflow limit. If the bit rate is below the limit (not exceeded case), then the control leaves the method 1230. Otherwise (rate limit is exceeded case), the control is passed to a next component test step 1244.

In one arrangement of the method 1200, the step 1242 is altered such that the video encoder 114, under the control of the processor 205, in addition to estimating the bit rate also estimates the distortion. In this arrangement the cost of the current candidate combination is updated to reflect the change in the cost caused by the coefficient truncation at the step 1240. This arrangement has an advantage of providing precise cost estimation for optimal candidate combination selection at the step 1216 of the method 1200.

In another arrangement of the method 1200, step 1242 is altered such that the distortion is not estimated. This arrangement has an advantage of reduced algorithmic complexity.

At the next component test step 1244, the variable COMP is advanced to a next component, looping sequentially through values 'Cr' (cIdx=2), 'Cb' (cIdx=1) and 'Y' (cIdx=0) at each iteration. The current index variable INDEX (or 'cIdx') is decreased by one each time the COMP variable is assigned the value 'Cr'. If the value of the variable INDEX falls below zero, i.e. each value of cIdx from 2 down to 0 has been traversed, then the control in the processor 205 leaves the method 1230, otherwise the control in the processor 205 is passed to the step 1240.

In an alternative arrangement of the method 1230, the video encoder 114, under control of the processor 205, at the step 1240 does not zero the current coefficient Instead, at the step 1240, the current coefficient value is divided by two (2), using integer division. Also at the step 1244, if the value of the variable INDEX below zero, but at least one coefficient is not zero, then the control is passed to the step 1238. Otherwise, the control leaves the method 1230.

In an arrangement of the system 100, the Rice parameter is not altered from one coefficient to the next in each sub-block. In such arrangements, the step 1234 is simplified in that the cost of remaining residual coefficients does not change as the truncation process proceeds. Then, the cost of each truncated coefficient can simply be replaced with the cost of the truncated (zero-valued) residual coefficient. Hence, there is no need to re-evaluate the costs of the remaining residual coefficients, with potentially differing Rice parameters.

Figure 13:
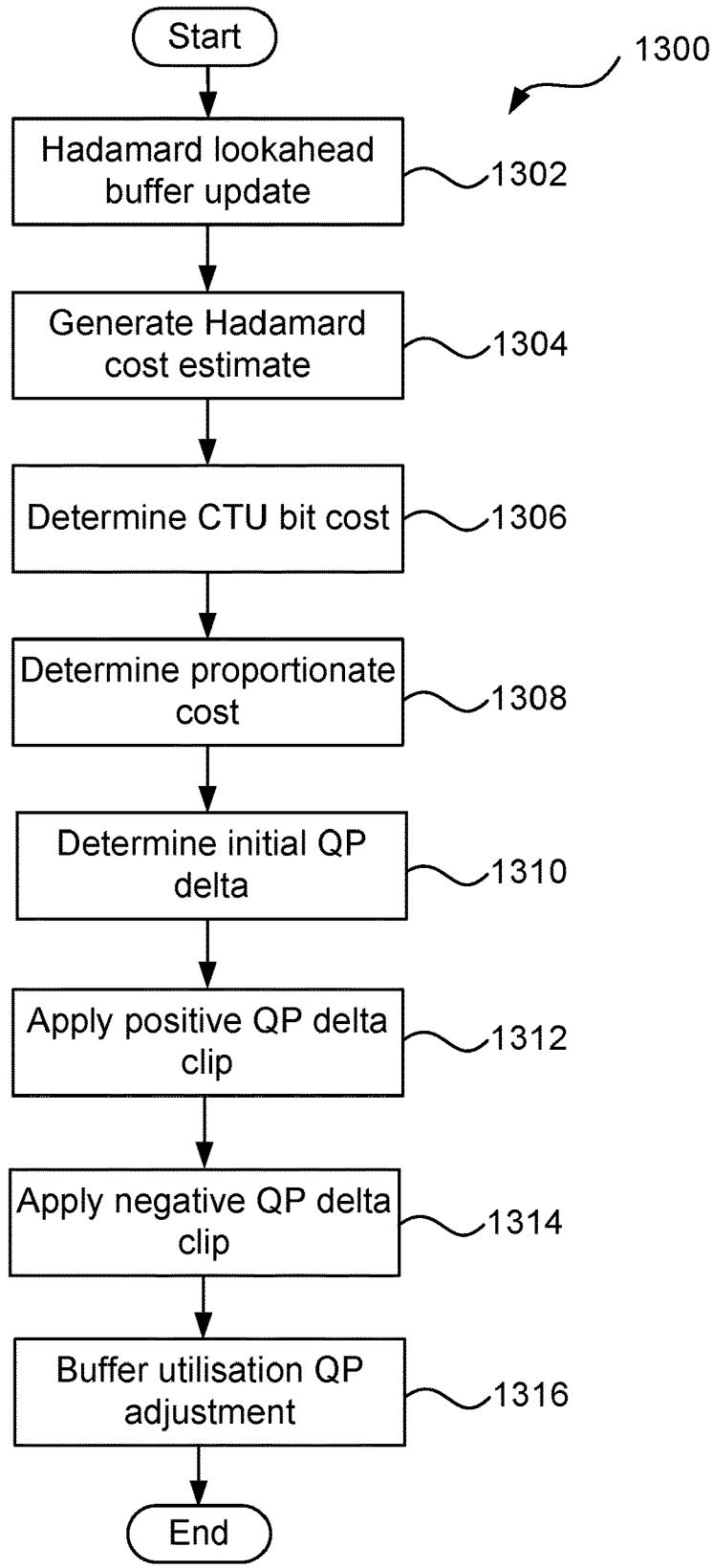
FIG. 13 is a schematic flow diagram showing a method for determining a QP adjustment based upon Hadamard cost estimation of uncompressed video data.

FIG. 13 is a schematic flow diagram showing a method 1300 for determining a QP adjustment based upon Hadamard cost estimation of uncompressed video data.

The method 1300 may be implemented by the video encoder 114, as one or more software code modules of the application program 233 resident in the hard disk drive 210 and being controlled in its execution by the processor 205.

The method will be described by way of example with reference to the CTU 513 of FIG. 5.

The method 1300 begins at a Hadamard lookahead buffer update step 1302.

At the Hadamard lookahead buffer update step 1302, the video encoder 114, under control of the processor 205, performs an update to the Hadamard lookahead buffer configured, for example, within the memory 206. Step 1302 involves reading one new CTU, such as the CTU 513 (the rightmost CTU in the Hadamard window), from the block partitioner 3100 into the Hadamard lookahead module 3101 and determining the Hadamard transform of the CTU 513. Control in the processor 205 then passes from the step 1302 to a generate Hadamard cost estimate step 1304.

At the generate Hadamard cost estimate step 1304, the video encoder 114, under control of the processor 205, generates a cost estimate for the CTU 513. The cost estimate is produced by summing the Hadamard coefficients. Then, a running cost of all CTUs in the Hadamard lookahead window is maintained, for example, by summing the costs of the CTUs in the Hadamard lookahead window (i.e. the last sixteen (16) CTUs processed). The cost of the current CTU 512 (the leftmost CTU in the Hadamrd lookahead window), is divided by the maintained running cost to produce a proportionate cost estimate. The proportionate cost estimate indicates the relative coding complexity of the current CTU versus a limited run of future CTUs (i.e. CTUs that have had Hadamard costs estimated but have not yet been encoded). As the end of the slice segment/CTU row approaches, a point is reached where the number of remaining CTUs is fewer than the size of the Hadamard window. In such a case, the Hadamard window size is reduced to match the number of remaining CTUs in the slice segment. Control in the processor 205 then passes from the step 1304 to a measure CTU bit cost step 1306.

At the measure CTU bit cost step 1306, the video encoder 114, under control of the processor 205, determines the coded cost of the CTU currently being coded 512. The cost is the bit cost of coding all syntax elements associated with the CTU 512. As only entropy coding is used and not arithmetic coding each syntax element cost is an integer number of bits. One bit for the minimum slice termination syntax element, coded after each CTU, is also included. The syntax element is unary coded and provides for inter-CTU padding to prevent output decoupler 3108 FIFO underflows. However the padding is not included as a CTU coding cost, as the padding is independent of mode decisions made in the video encoder engine 3104. Control in the processor 205 then passes to a determine proportionate cost step 1308.

At the determine proportionate cost step 1308, the video encoder 114, under control of the processor 205, determines the proportionate cost of the CTU 512 by scaling the cost estimate for the CTU 512 against a predetermined target rate for the CTU 512. The scaling performed at the step 1308 allows for each CTU to be allocated sufficient bits that match the relative complexity of that CTU against others in the Hadamard lookahead window, scaled to the target bit rate of the system 100. The target bit rate is set at a value slightly lower than the mandated system target rate, as implied by the specified 'bits per pixel' or compression ratio. The reduction in the target bit rate may be the result of subtracting the bits transmitted over the FIFO emptying period 618 from the 622 from the bits transmitted over the CTU row transmission period 618, and scaling the result according to the number of CTUs in the CTU row. The mandated system target bit rate is an absolute limit that, if exceeded, results in an invalid bitstream. Then, the target bit rate is set to match the capacity of the communications channel 120 over the CTU row encoding data output period 620. Any overshoot from the set target rate is accommodated in the output decoupler 3108 FIFO, and is safely transmitted during the FIFO emptying period 622. Accommodating any overshoot from the set target bit rate in the output decoupler 3108 FIFO allows for significant local variance in CTU coding cost, as can be expected from various video data encountered by the system 100. Moreover, accommodating any overshoot from the set target bit rate in the output decoupler 3108 FIFO, in combination with the residual truncation of the method 1200, contributes to ensuring CBR operation regardless of input data. Control in the processor 205 then passes from the step 1308 to a determine initial QP delta step 1310.

At the determine initial QP delta step 1310, the rate control module 348, under control of the processor 205, determines a QP delta for use in coding the next CTU. A QP delta syntax element is coded once per CTU, providing a means for signalling changes in QP from one CTU to the next. The magnitude of changes capable of being expressed by the delta QP syntax element in the bitstream may be limited, (e.g. to +/−12), in accordance with the HEVC specification, to improve coding efficiency of the QP delta syntax element while providing adequate flexibility. The QP provides a logarithmic specification of the quantisation step size to convert residual coefficients in the bitstream into transform coefficients to be provided to the inverse transform module 328 and 422. An increase of QP by six corresponds to a doubling of the quantisation step size. As such, a given set of transform coefficients may be represented with residual coefficients of halve the magnitude, giving a more compact representation, at the expense of greater distortion due to the sacrifice of a greater amount of remainder in the quantisation module 322. The actual CTU coding cost (i.e., the 'bits spent' on coding the CTU) is divided by the anticipated CTU coding cost, to derive a quantisation step adjustment factor. By taking the base-2 logarithm of the quantisation step adjustment factor, a delta QP is obtained. Multiplication by six results in the mathematically correct QP delta. However the determined QP delta ignores the inherent weakness of the correlation in the relationship between Hadamard costs and actual coding costs. As such, the multiplicative factor is reduced, or omitted altogether (i.e. a scaling of '1' is used). Thus, a candidate QP is provided on a CTU-by-CTU basis to more closely target an appropriate rate for each CTU. Control in the processor 205 then passes from the step 1310 to an apply positive QP delta clip step 1312.

At the apply positive QP delta clip step 1312, the rate control module 348, under control of the processor 205, performs a clip of the candidate QP delta to restrict the maximum increase in QP for a given CTU to the next. Although the HEVC QP delta syntax imposes a limit of +/− twelve (12), the clip of the candidate QP delta further limits the maximum QP increase, e.g. to +6 per CTU. The limit of maximum QP increase of +6 is imposed to reduce the rate of quality degradation in response to an increase in Hadamard costs encountered for CTUs to be coded. Control in the processor 205 then passes to an apply negative QP delta clip step 1314.

At the apply negative QP delta clip step 1314, the rate control module 348, under control of the processor 205, performs a clip of the candidate QP delta to restrict the maximum decrease in QP for a given CTU to the next. Again, the restriction on the maximum decrease in QP for a given CTU is greater than the restriction inherent in the HEVC QP delta signalling syntax. Moreover, the restriction in the maximum QP decrease is greater than the restriction in the increase imposed in the step 1312. The difference in the restriction in the maximum decrease and the restriction in the increase imposed in the step 1312 is imposed since when measuring Hadamard costs against actual CTU costs, a relatively weak correlation, was observed. The method 1300 is configured to be conservative in the sense that buffer overflows are to be avoided as much as possible, and QP adaptation from one CTU to the next should generally be relatively small. As such, when Hadamard costs indicate that the current CTU 512 will be more costly to code than preceding CTUs, a relatively rapid QP increase of up to six is permitted. Then, the residual coding cost can be reduced rapidly in response to increased coding complexity. In practice, the actual cost increase may not be as severe as anticipated from the Hadamard costs. Nevertheless the steps of the method 1300 described above avoids the situation where the output decoupler module 3108 FIFO rapidly fills, requiring residual truncation after a run of 'expensive' CTUs are coded. On the other hand, when the Hadamard costs indicate that the current CTU will be less costly to code than preceding CTUs, the QP is only decreased by a small amount, e.g. one (1) per CTU. Experiments show that a reduced Hadamard cost does not guarantee a reduced coding cost. A rapid QP decrease may lead to excessive residual coefficients filling up the output decoupler 3108 FIFO. A slow QP decrease of one (1) per CTU provides a more tentative quality increase. Should the residual cost increase more than expected, the method 1300 will then automatically cease further QP decreases, or even increase QP, to avoid excessive buffer filling. Control in the processor 205 then passes from the step 1314 to a buffer utilisation QP adjustment step 1316.

At the buffer utilisation QP adjustment step 1316, the rate control module 348, under control of the processor 205, may apply a further QP adjustment based on the utilisation of the output decoupler 3108 FIFO. The purpose of the adjustment in the step 1316 is to reduce coded CTU size as the FIFO fills, to reduce instances of residual truncation. For example, the following QP adjustments are possible at the step 1316 for each range of FIFO utilisation:

| | |
|---|---|
| 0% to 75% | No adjustment |
| 75% to 78% | QP increase by 1 |
| 78% to 81% | QP increase by 2 |
| 81% to 84% | QP increase by 3 |
| 84% to 88% | QP increase by 4 |
| 88% to 91% | QP increase by 5 |
| 91% to 97% | QP increase by 6 |
| 97% to 100% | QP increase by 8 |

As such, the first three-quarters (¾) of the FIFO may be used without consideration of the FIFO capacity (i.e. QP adjustment based only on clipped Hadamard cost adjustment). Use of the final one quarter (¼) of the FIFO results in QP increase, to reduce residual cost and attempt to avoid the need for residual truncation. Thus, although the target bit rate of the rate control module 348 attempts to fit all CTU data into the CTU data transmission period 618, it is acceptable (and expected) that wide local variance in coded CTU block size will result in potentially most of the FIFO emptying period 622 also being used for transmission of CTU data. The method 1300 then terminates following the step 1316.

In one arrangement of the method 1300, the step 1304 is modified such that end-of-CTU row condition does not result in a reduction in the length of the Hadamard lookahead window. Instead, the window may remain the same size, and the cost of the final CTU in the CTU row may be duplicated into window locations beyond the end of the CTU row. Then, the proportional estimation continues to use the full window size, even though this does not map fully onto CTUs in the frame. An arrangement where step 1304 is modified so that end-of-CTU row condition does not result in a reduction in the length of the Hadamard lookahead window has the advantage that by maintaining the full Hadamard lookahead window, the cost estimate changes more smoothly as the end of the CTU row is reached. In particular, the cost estimate tends towards the cost estimate of the final CTU in the CTU row. Alternatively, if the window were to reduce in size, eventually the Hadamard cost estimate would be the cost estimate for the final CTU in the CTU row. However, towards the end of the CTU row, window sizes of only a few CTUS would be encountered. As Hadamard costs vary quite widely, and do not correlate very strongly with actual coding cost, averaging over such small window sizes would result in instability in the cost estimation that would mislead the rate control module 348 into making unnecessary QP adjustments as the end of slice was approached.

In another arrangement of the method 1300, the measure CTU bit cost step 1306 is modified such that the CTU cost is divided into a 'fixed cost' and a 'variable cost'. The fixed cost approximates the minimum cost of coding a CTU. As such, the fixed portion of the cost of coding a CTU cannot be influenced by altering the QP. The fixed cost of coding a CTU includes the signalling cost of the prediction mode, use of ACT, transform skip and CCP. This cost may reasonably include the minimum residual coding cost, generally the cost of coding sub-block 0 (for the TB associated with each colour channel), which is always coded as there is no corresponding coefficient group flag seen in FIG. 7A. The fixed cost may be sixty-six (66) bits. The fixed cost is removed from the actual cost of coding a CTU to obtain a 'variable cost'. The variable cost is predominantly due to residual coding cost, which is affected by changing QP. Then, in the step 1308, the variable cost component may be used instead of the total CTU cost. Using the variable cost component instead of the total CTU cost in the step 1308 increases the correlation between the Hadamard costs and the actual coded costs, as the systemic bias of the uncontrollable fixed cost of signalling modes is taken into account. Using the variable cost component instead of the total CTU cost alleviates a situation where the rate control module 348 attempts to reduce the coded cost of some CTUs below the minimum (fixed) cost, causing unwarranted increases in QP, that later lead to subjective artefacts as artificially high QPs are used. Using the variable cost component instead of the total CTU cost incorporates a 'fixed' and 'variable' cost component for each coded CTU form an attempt to improve the relationship between the Hadamard costs and the coded CTU costs, having low complexity from the simple model. More complex models are also possible. For example, the initial Rice parameter influences the minimum coding cost. As seen in FIG. 8, a sub-block of coefficients with an initial Rice parameter of zero (0) would require sixteen (16) bits to code, and a sub-block of coefficients with an initial Rice parameter of one (1) would require thirty-two (32) bits to code. Then, the fixed cost value can be improved by considering the initial Rice parameter for each TB in the CTU. A minimum cost would involve a PART_2N×2N partition mode with 8×8 TBs and is derived as follows:

Mininmum cost=2[TBs]*(3[coef_group_flags]+16 [residual coefficients]*(IRP [initial Rice parameter]+1))+9[minimum overhead].

For an initial Rice parameter of 0, this yields the minimum cost of 66 bits as previously stated. The minimum overhead of 9 bits is for delta QP, intra prediction mode, CCP signalling, ACT signalling, and transform skip signalling.

In another arrangement of the method 1300, the maximum value of the QP 384 is limited further than the range afforded by the HEVC specification. HEVC permits QPs as high as fifty-one (51). However such a value corresponds to very severe quantisation and should generally not be used in a system purporting to offer visually lossless quality. Then, the maximum QP may be restricted to a lower value (e.g. forty (40)) to limit excursions into high QPs. With the QP decrease clipped to −1 per CTU, restoring QP from the maximum of 40 to a value of thirty (30) would require ten (10) CTUs. Excursions to such high QPs are rarely encountered, but some capacity to support such excursions to high QPs is needed in case of video data with excessive noise (or even white noise). Such video data falls far outside the statistics expected of input frame data, but the video encoder 114 must still produce a conforming bitstream. Thus, the restriction on QP decrease is tied to the limit of maximum QP to reduce the length of runs of CTUs with excessively high QPs. Tying restriction on QP decrease to the limit of maximum QP has been observed to improve subjective quality, especially in cases where a 'smooth' region is encountered after coding a highly complex region. Limiting the final maximum QP for the QP further than the range afforded by the HEVC specification eliminates blocking artefacts resulting from the use of excessively high QPs when entering the smooth region.

In an arrangement of the system 100, the supported signalling of delta QP is restricted to accord with the reduced range of delta QPs resulting from the clips of the steps 1312 and 1314. For example, the syntax element can restrict signalled delta QPs to a range of [−1, 6], instead of the range of [−12, 12] as specified in HEVC. Arrangements with such a restriction provide a coding efficiency advantage in that the coding space of delta QP is restricted to the range actually utilised by the video encoder engine 3104.

In an arrangement of the system 100, the Rice parameter is initialised to 0 for each sub-block, i.e. there is no use of state variables for initialisation of a current sub-block based on the magnitude of residual coefficients encountered in previous sub-blocks. In such arrangements, the minimum cost calculation always uses the fixed value. Moreover, in the residual truncation process, there is no need to consider initial Rice parameters for earlier sub-blocks in the TB, that may be affected by the truncation of residual coefficients in later sub-blocks in the TB. In particular, when truncating residual coefficients on a sub-block by sub-block basis, consideration of the Rice parameter is not required. Such arrangements result in lower complexity, due to the absence of re-evaluation logic. The iterative nature of the residual truncation process implies that a large complexity reduction is achieved in such arrangements.

FIG. 14A is a schematic block diagram showing a first compressed slice segment 1400 in a compressed frame of video data. The slice segment 1400, being the first slice segment in a frame, includes a high-level syntax (HLS) packet 1402. The HLS packet 1402 has a fixed size, such as thirty-two (32) bytes, and contains all necessary information for the video decoder 134 to determine the starting locations of each slice segment in the bitstream. In particular, each slice segments begins with a SH packet and the remainder of the allocated space is occupied by CTU data (and some filler code). Appendix A shows example syntax for the HLS packet 1402. Then, a slice header (SH) packet 1404 defines the syntax for the current slice segment. The SH packet 1404 is also of a fixed size, such as forty-eight (48) bits. The syntax of the SH packet 1404 is shown in Appendix B. The HLS packet 1402 defines the frame dimensions and the target bit rate of the communications channel 120. As such, the compressed size of each CTU row can be determined, noting that the uncompressed size corresponds to eight (8) raster scan lines of the frame. Then, the CTU data 1406 is this size (i.e. 8 raster scan lines of the frame), with the overhead from the HLS packet 1402 and the SH packet 1404 subtracted.

FIG. 14B is a schematic block diagram showing a non-first compressed slice segment 1420 in a compressed frame of video data. The slice segment 1420 format is used for all slice segments in a frame excluding the first one. The slice segment 1420 includes a SH packet 1422, having syntax as defined in Appendix B. Relative to the start of the HLS packet 1402 of the slice segment 1400, the start locations of each subsequent slice segment (e.g. 1420) can be determined, along with the locations of the CTU data within each slice segment. The rate control module 348 adjusts a target bit rate budget for each slice segment according to the presence of the SH (and possibly HLS) packets. The target bit rate budget may be the number of bits to be transmitted over the communications channel 120 during the period 620, less the fixed overhead of the SL (and possibly HLS) packets.

Each frame is structured according to FIGS. 14A & 14B, hence decoding can commence at any frame start, with no dependencies on state from previous frames. This ability is known as 'instantaneous decoder refresh' in HEVC (available in specific configurations), and is retained in the system 100 to provide random access at the frame level, as the standard configuration of the system 100. Such a feature is useful when switching from one source of compressed data to another, as the switch can seamlessly occur on the frame boundary (with no corrupted output or missing frames presented to the viewer). Each row of CTUs ('slice segment') conforms to the definition as per the HEVC specification. In particular, each slice segment can be parsed by the entropy decoder 420 without reference to preceding slice segments (excepting that information from the HLS packet must be known to determine the size of each slice segment in the bitstream and their starting offsets). However, the intra prediction process can reference samples across a slice segment boundary, resulting in improved coding efficiency compared to prohibiting such accesses. For a multi-core architecture, this implies a limited degree of inter-core communications, as the lowermost row of samples from one slice segment must be communicated to another core to supply reference samples above the CTUs of the next slice segment. The coding efficiency of the especially the directional intra-prediction modes is greatly improved using such an arrangement.

Appendices A & B show the syntax for the HLS packet and the SH, respectively. In each case, syntax elements functions generally correspond to similarly named syntax elements in HEVC. All syntax elements in Appendices A & B are defined as fixed length values, specified as u(x) where 'x' is the number of bits present in the syntax element. Thus, the total length of the HLS packet and the SH are fixed. To accommodate future expansion, the packet lengths are rounded up to 256 and 48 bits, respectively, with the unused space filled with '0' bits. The HLS packet includes 'frame_rate' (frame rate in frames per second) and 'target_rate' (bitstream target rate in bits per second). These two values, in combination with the frame dimensions and bit depth, enable the 'bits per pixel' and compression ratio to be derived. Moreover, these resulting definitions define the fixed bitstream structure, as described in FIGS. 14A and 14B.

INDUSTRIAL APPLICABILITY

The arrangements described are applicable to the computer and data processing industries and particularly for the digital signal processing for the encoding a decoding of signals such as video signals for a low-latency (sub-frame) video coding system.

The foregoing describes only some embodiments of the present invention, and modifications and/or changes can be made thereto without departing from the scope and spirit of the invention, the embodiments being illustrative and not restrictive.

APPENDIX A

The syntax elements present in a high-level syntax packet of FIG. 14A are shown below.

| Syntax element | Coding |
| --- | --- |
| Profile | u(8) |
| Level | u(8) |
| target_rate | u(40) |
| frame_rate | u(8) |
| chroma_format_idc | u(2) |
| pic_width_in_luma_samples | u(16) |
| pic_height_in_luma_samples | u(16) |
| conformance_window_flag | u(1) |
| if (conformance_window_flag) { | |
|     conf_win_left_offset | u(3) |
|     conf_win_right_offset | u(3) |
|     conf_win_top_offset | u(3) |
|     conf_win_bottom_offset | u(3) |
| } else { | |
|     conf_win_filler | u(12) |
| } | |
| bit_depth_luma_minus8 | u(4) |
| bit_depth_chroma_minus8 | u(4) |
| init_qp_minus26_sign | u(1) |
| init_qp_minus26_abs | u(5) |
| transform_skip_enabled_flag | u(1) |
| cu_qp_delta_enabled_flag | u(1) |
| pps_cb_qp_offset_sign | u(1) |
| pps_cb_abs_qp_offset | u(4) |
| pps_cr_qp_offset_sign | u(1) |
| pps_cr_abs_qp_offset | u(4) |
| pps_slice_chroma_qp_offsets_present_flag | u(1) |
| transquant_bypass_enabled_flag | u(1) |
| entropy_coding_sync_enabled_flag | u(1) |
| cross_component_prediction_enabled_flag | u(1) |

APPENDIX B

The syntax elements present in a slice header packet of FIGS. 14A and 14B are shown below.

| Syntax element | Coding |
| --- | --- |
| first_slice_segment_in_pic_flag | u(1) |
| no_output_of_prior_pics_flag | u(1) |
| dependent_slice_segment_flag | u(1) |
| slice_segment_address | u(20) |
| slice_qp_delta_sign | u(1) |
| slice_qp_delta_abs | u(7) |
| slice_cb_qp_offset_sign | u(1) |

-continued

| Syntax element | Coding |
| --- | --- |
| slice_cb_qp_offset_abs | u(4) |
| slice_cr_qp_offset_sign | u(1) |
| slice_cr_qp_offset_abs | u(4) |
| alignment_zeros | u(7) |

The invention claimed is:

1. A method of encoding a coding tree unit in a video bitstream, the method comprising:
   forming a plurality of candidate configurations for the coding tree unit, each of the candidate configurations having a variation of at least one of a set of partitioning modes and encoding parameters;
   selecting a candidate configuration from the plurality of candidate configurations based on a predetermined maximum bit rate for the coding tree unit, the selected candidate configuration having a size within the predetermined maximum bit rate;
   applying residual truncation to the selected candidate configuration by setting residual coefficients in at least one sub-block of at least one of two chroma channel transform blocks of the coding tree unit to zero, and, if the residual coefficients in all of the sub-blocks of the at least one of two chroma channel transform blocks of the coding tree unit are set to zero, setting residual coefficients in at least one sub-block of a luma channel transform block of the coding tree unit to zero, the residual coefficients in the sub-blocks being set to zero by working backwards from a sub-block containing highest frequency residual coefficients to a sub-block containing lowest frequency residual coefficients until a total size of the remaining residual coefficients in the chroma channel and luma channel transform blocks is less than or equal to the maximum bit rate; and
   encoding the coding tree unit using the truncated candidate configuration.

2. The method according to claim 1, wherein the selected candidate configuration uses the PART_2N×2N partition mode.

3. The method according to claim 1, wherein one partitioning mode is applied for each of the plurality of candidate configurations.

4. The method according to claim 1, wherein overall cost C of the selected candidate configuration is determined as follows:

$$C=R+\lambda D,$$

where R represents the predetermined bit rate, D represents distortion resulting from the selected candidate configuration, and $\lambda$ represents a lagrangian multipler.

5. The method according to claim 4, wherein the selected candidate configuration has a lowest overall cost of the plurality of candidate configurations.

6. The method according to claim 1, further comprising determining if the bit rate of the selected candidate configuration exceeds the predetermined maximum bit rate.

7. The method according to claim 1, further comprising determining if the bit rate of the selected candidate is marked as a truncated candidate.

8. The method according to claim 1, wherein candidate configurations that have had residual truncation performed thereon are excluded in selecting the candidate configuration.

9. The method according to claim 1, further comprising excluding searching for the candidate configurations using a PART_N×N block partition mode.

10. The method according to claim 1, further comprising applying an adaptive colour transform to the coding tree unit.

11. The method according to claim 1, further comprising performing cross-component prediction to predict chroma residual.

12. A system for encoding a coding tree unit in a video bitstream, the system comprising:
   one or more memories storing data and a computer program;
   one or more hardware processors in communication with the one or more memories for executing the computer program, the computer program having instructions for:
   forming a plurality of candidate configurations for the coding tree unit, each of the candidate configurations having a variation of at least one of a set of partitioning modes and encoding parameters;
   selecting a candidate configuration from the plurality of candidate configurations based on a predetermined maximum bit rate for the coding tree unit, the selected candidate configuration having a size within the bit rate;
   applying residual truncation to the selected candidate configuration by setting residual coefficients in at least one sub-block of at least one of two chroma channel transform blocks of the coding tree unit to zero, and, if the residual coefficients in all of the sub-blocks of the at least one of two chroma channel transform blocks of the coding tree unit are set to zero, setting residual coefficients in at least one sub-block of a luma channel transform block of the coding tree unit to zero, the residual coefficients in the sub-blocks being set to zero by working backwards from a sub-block containing highest frequency residual coefficients to a sub-block containing lowest frequency residual coefficients until a total size of the remaining residual coefficients in the chroma channel and luma channel transform blocks is less than or equal to the maximum bit rate; and
   encoding the coding tree unit using the truncated candidate configuration.

13. The method according to claim 1, wherein the maximum bit rate is the remaining capacity in a buffer for holding encoded coding tree units prior to transmission.

* * * * *